(12) United States Patent
Swaminathan et al.

(10) Patent No.: US 10,595,069 B2
(45) Date of Patent: Mar. 17, 2020

(54) PRIORITIZING TILE-BASED VIRTUAL REALITY VIDEO STREAMING USING ADAPTIVE RATE ALLOCATION

(71) Applicant: Adobe Inc.

(72) Inventors: Viswanathan Swaminathan, Saratoga, CA (US); Mohammad Hosseini, Champaign, IL (US)

(73) Assignee: Adobe Inc., San Jose, CA (US)

( * ) Notice: Subject to any disclaimer, the term of this patent is extended or adjusted under 35 U.S.C. 154(b) by 172 days.

(21) Appl. No.: 15/593,050

(22) Filed: May 11, 2017

(65) Prior Publication Data
US 2018/0160160 A1    Jun. 7, 2018

Related U.S. Application Data

(60) Provisional application No. 62/430,313, filed on Dec. 5, 2016.

(51) Int. Cl.
*H04L 29/06* (2006.01)
*H04L 12/927* (2013.01)
(Continued)

(52) U.S. Cl.
CPC ....... *H04N 21/2662* (2013.01); *H04L 47/805* (2013.01); *H04L 65/4084* (2013.01);
(Continued)

(58) Field of Classification Search
None
See application file for complete search history.

(56) References Cited

U.S. PATENT DOCUMENTS

| | | | |
|---|---|---|---|
| 2004/0190452 A1* | 9/2004 | Imiya | H04L 43/00 370/232 |
| 2013/0103849 A1* | 4/2013 | Mao | H04N 21/8456 709/231 |

(Continued)

FOREIGN PATENT DOCUMENTS

| | | |
|---|---|---|
| WO | WO 2015/184416 A1 | 12/2015 |
| WO | WO 2016/138043 A1 | 9/2016 |

OTHER PUBLICATIONS

M. Hosseini et al, "Adaptive 360 VR Video Streaming: Divide and Conquer!", Published Sep. 2016, arXiv, Available from https://arxiv.org/abs/1609.08729v1 See whole document particularly section III. Methodology and section V. Conclusion and Further Work.

(Continued)

*Primary Examiner* — Aaron N Strange
*Assistant Examiner* — Mohammad Yousuf A. Mian
(74) *Attorney, Agent, or Firm* — Keller Jolley Preece

(57) ABSTRACT

The present disclosure includes methods and systems for streaming high-performance virtual reality video using adaptive rate allocation. In particular, an adaptive rate allocation system partitions a panorama video into segments or tiles and assigns priorities to each tile or segment based on input (e.g., a viewport of field-of-view) from a user client device. Further, the adaptive rate allocation system streams each tile or segment to the user client device according to the adaptive rate allocation, which maximizes bandwidth efficiency and video quality. In this manner, the adaptive rate allocation system delivers higher quality content to regions in the panorama video where a user is currently looking/most likely to look.

20 Claims, 9 Drawing Sheets

(51) Int. Cl.
  H04N 21/2662 (2011.01)
  H04N 21/81 (2011.01)
  H04N 21/462 (2011.01)
  H04N 21/845 (2011.01)
(52) U.S. Cl.
  CPC .......... *H04L 65/605* (2013.01); *H04L 65/607* (2013.01); *H04L 65/80* (2013.01); *H04N 21/4621* (2013.01); *H04N 21/816* (2013.01); *H04N 21/8456* (2013.01)

(56) References Cited

U.S. PATENT DOCUMENTS

| 2013/0263179 | A1* | 10/2013 | Dow | H04N 21/458 725/32 |
| 2015/0249813 | A1 | 9/2015 | Cole et al. | |
| 2015/0346832 | A1* | 12/2015 | Cole | H04N 19/597 345/156 |
| 2016/0241836 | A1* | 8/2016 | Cole | H04N 19/597 |
| 2017/0251204 | A1* | 8/2017 | Gupte | H04N 13/178 |
| 2018/0241988 | A1* | 8/2018 | Zhou | H04N 21/21805 |

OTHER PUBLICATIONS

Combined Search and Examination Report as received in GB 1716286.8 dated Mar. 15, 2018.

D. De Vleeschauwer et al., "Optimization of HTTP adaptive streaming over mobile cellular networks," in Proc. of IEEE INFOCOM, 2013.

H. Seferoglu and A. Markopoulou, "Delay-optimized network coding for video streaming over wireless networks," in IEEE Communications (ICC), 2010.

S. Thakolsri, W. Kellerer, and E. Steinbach, "Qoe-based rate adaptation scheme selection for resource-constrained wireless video transmission," in Proc. of the ACM Multimedia, MM'10, 2010.

R. Huysegems, J. van der Hooft, T. Bostoen, P. Rondao Alface, S. Petrangeli, T. Wauters, and F. De Turck, "Http/2-based methods to improve the live experience of adaptive streaming," in Proceedings of the 23rd ACM International Conference on Multimedia, ser. MM'15. ACM, 2015, pp. 541-550.

T. Stockhammer, "Dynamic adaptive streaming over HTTP: standards and design principles," in Proc. of 2011 ACM Multimedia Systems, ser. MMSys '11, 2011.

J. Le Feuvre and C. Concolato, "Tiled-based adaptive streaming using mpeg-dash," in Proceedings of the 7th International Conference on Multimedia Systems, ser. MMSys '16. New York, NY, USA: ACM, 2016, pp. 41:1-41:3.

L. D'Acunto, J. van den Berg, E. Thomas, and O. Niamut, "Using mpeg dash srd for zoomable and navigable video," in Proceedings of the 7th International Conference on Multimedia Systems, ser. MMSys '16. New York, NY, USA: ACM, 2016, pp. 34:1-34:4.

M. Hosseini, J. Peters, and S. Shirmohammadi, "Energy-budgetcompliant adaptive 3D texture streaming in mobile games," in Proceedings of the 4th ACM Multimedia Systems Conference. ACM, 2013, pp. 1-11.

M. Hosseini, A. Fedorova, J. Peters, and S. Shirmohammadi, "Energy-aware adaptations in mobile 3D graphics," in Proceedings of the 20th ACM international conference on Multimedia. ACM, 2012, pp. 1017-1020.

M. Hosseini, J. Peters, and S. Shirmohammadi, "Energy-efficient 3d texture streaming for mobile games," in Proceedings of Workshop on Mobile Video Delivery, ser. MoViD'14. ACM, 2013, pp. 5:1-5:6.

A. DeVincenzi, L. Yao, H. Ishii, and R. Raskar, "Kinected conference: augmenting video imaging with calibrated depth and audio," in Proceedings of the ACM 2011 conference on Computer supported cooperative work. ACM, 2011, pp. 621-624.

M. Hosseini, G. Kurillo, S. R. Etesami, and J. Yu, "Towards coordinated bandwidth adaptations for hundred-scale 3d tele-immersive systems," Multimedia Systems, pp. 1-14, 2016.

M. Hosseini and G. Kurillo, "Coordinated bandwidth adaptations for distributed 3d tele-immersive systems," in Proceedings of the 7th ACM International Workshop on Massively Multiuser Virtual Environments, ser. MMVE '15. in conjunction with ACM Multimedia Systems conference (MMSys'15), ACM, 2015, pp. 13-18.

M. Gutierrez, F. Vexo, and D. Thalmann, "Stepping into virtual reality." Springer-Verlag London, 2008, ch. 2, pp. 18-19.

* cited by examiner

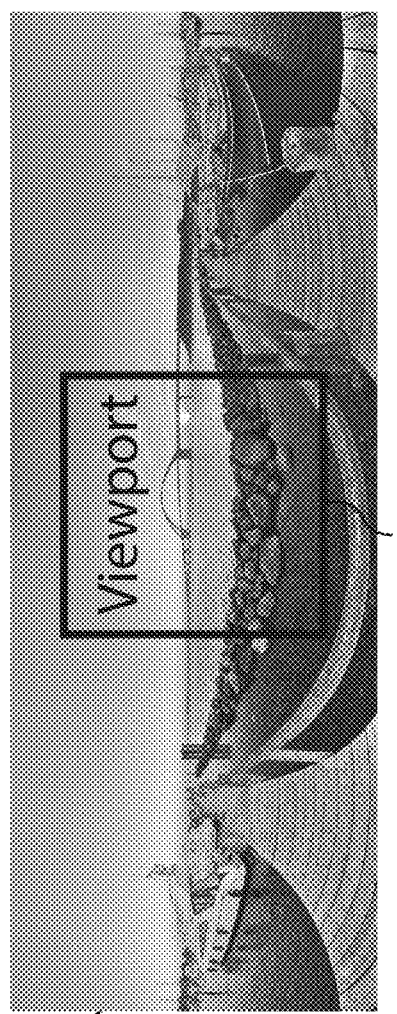
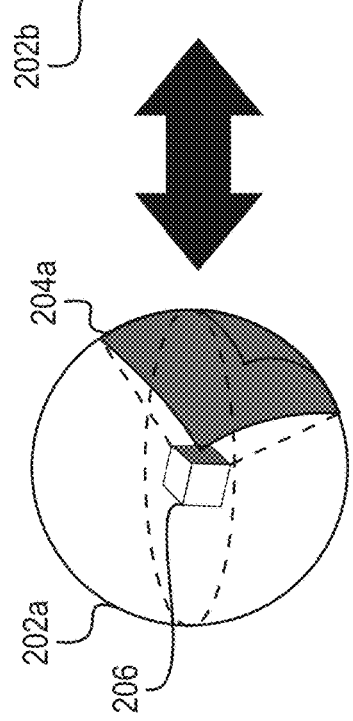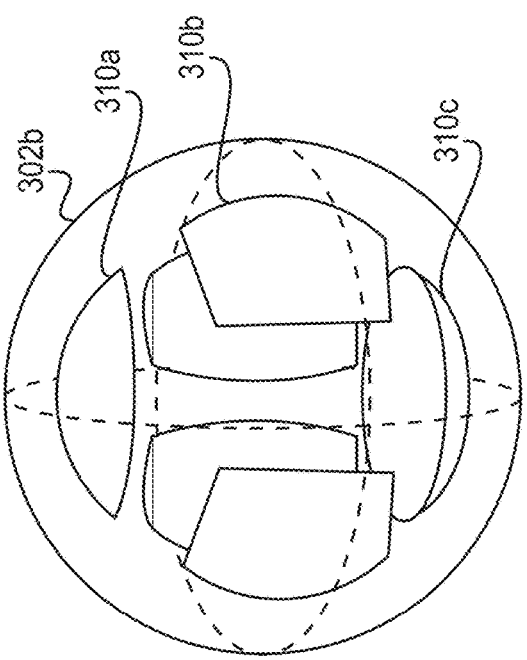
*Fig. 3B*
*Fig. 2*
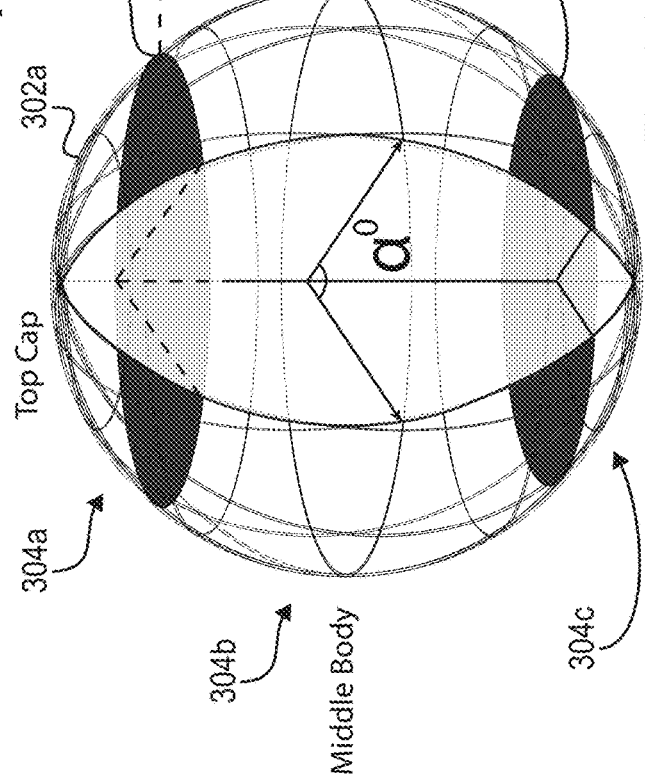
*Fig. 3A*

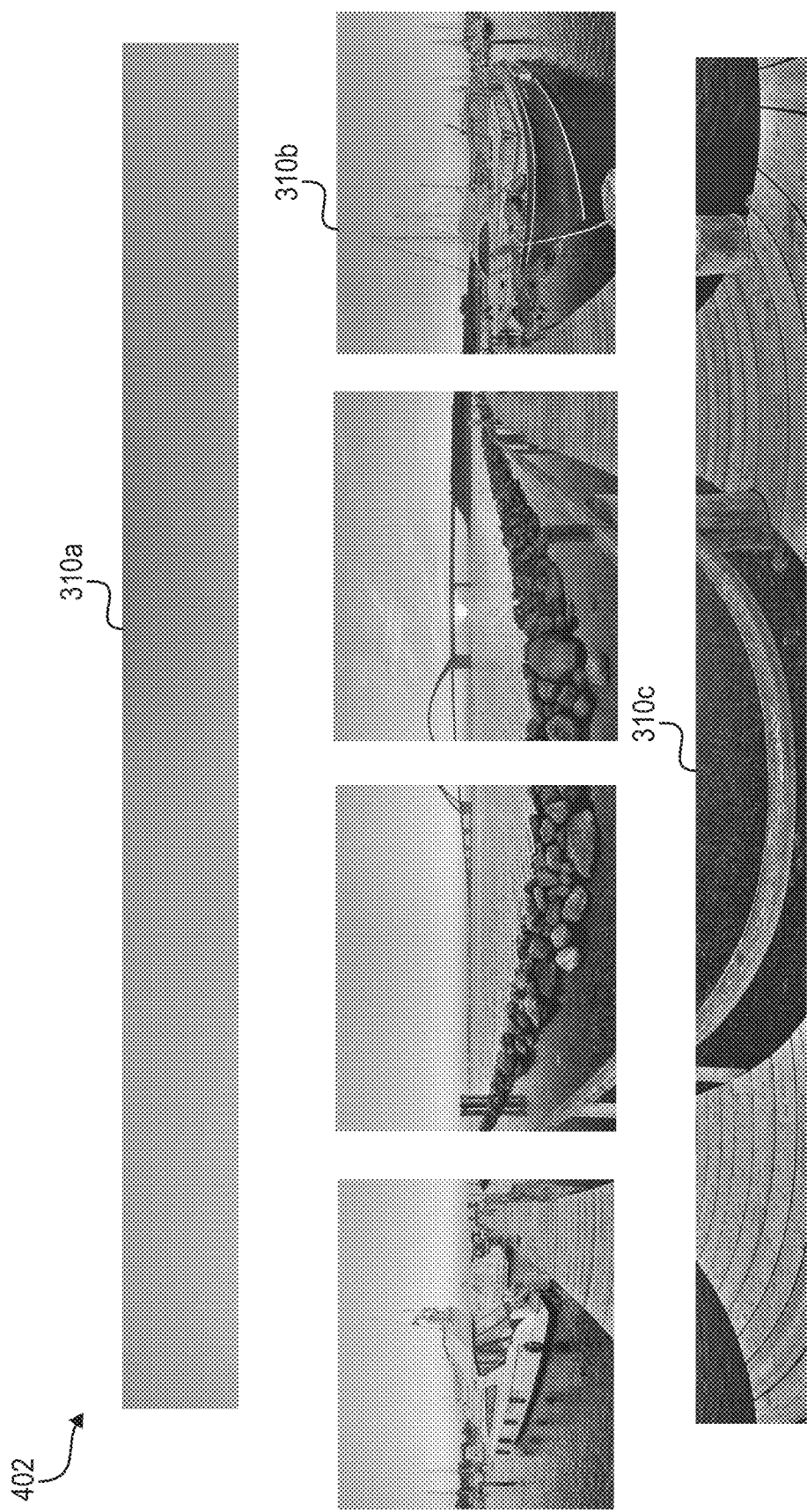

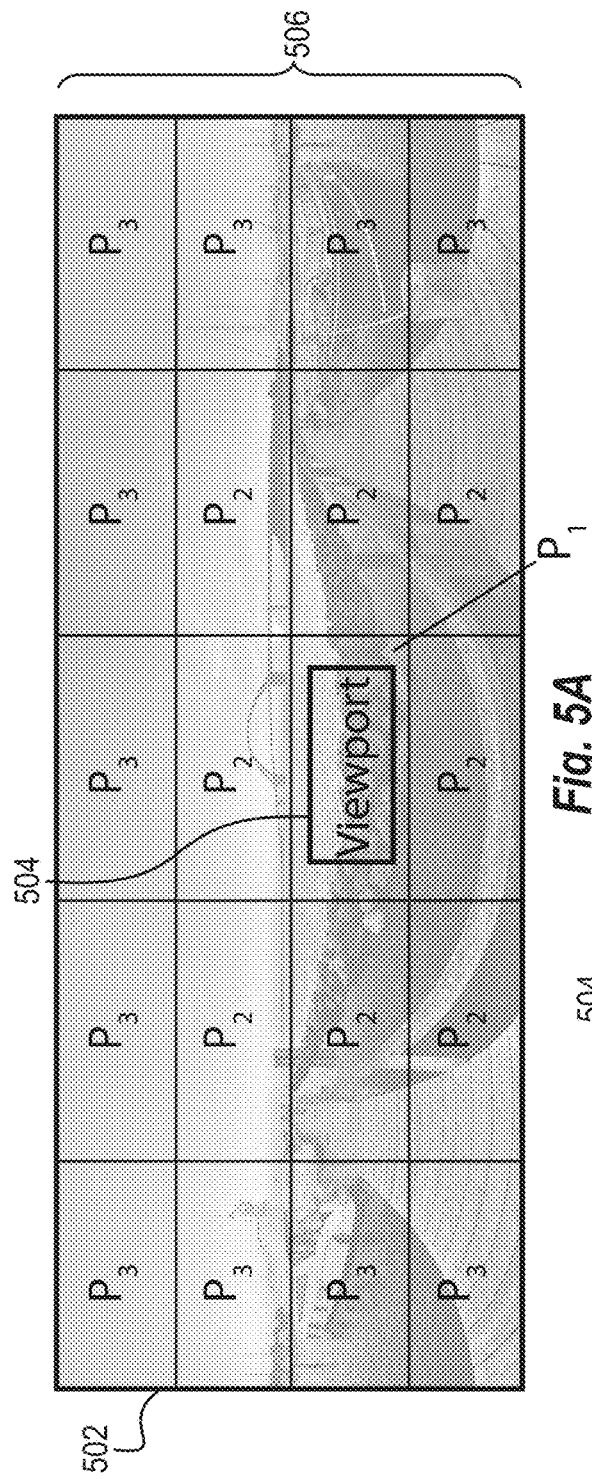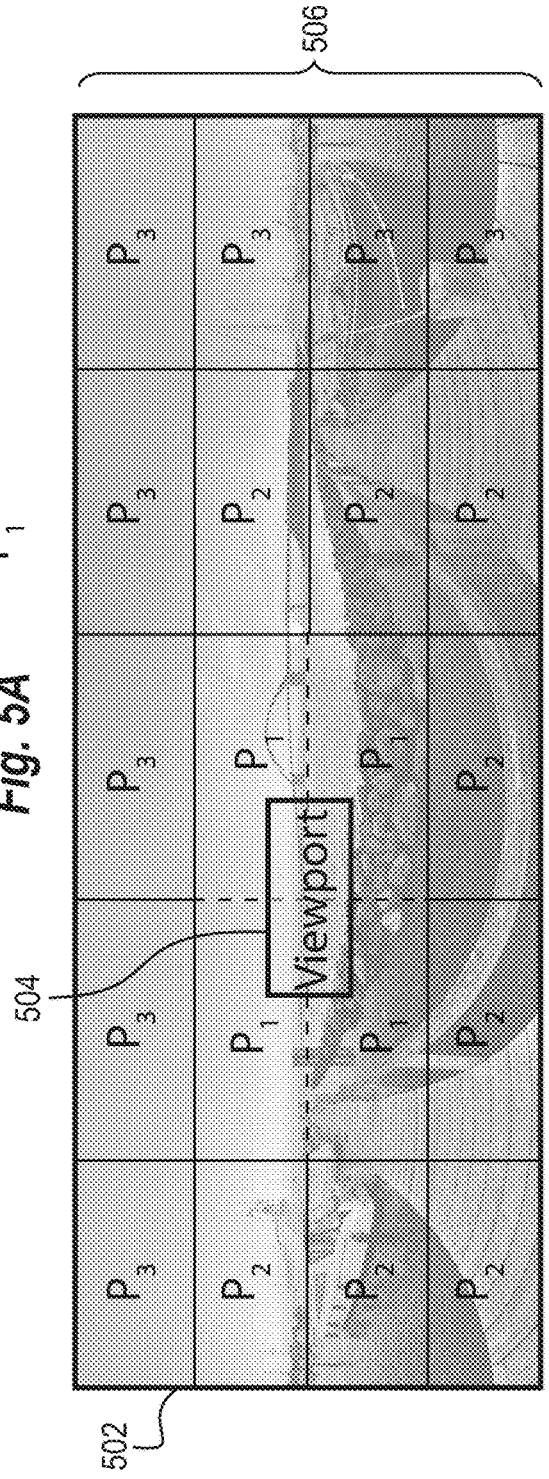
Fig. 5A
Fig. 5B

PRIORITIZING TILE-BASED VIRTUAL REALITY VIDEO STREAMING USING ADAPTIVE RATE ALLOCATION

CROSS REFERENCE TO RELATED APPLICATIONS

This application claims the benefit of priority to U.S. Provisional Patent Application No. 62/430,313, filed Dec. 5, 2016, which is incorporated herein by reference in its entirety.

BACKGROUND

Advances in computing hardware and networking technologies, including the availability of high bandwidth, have urged the development of networked multimedia applications (online video games, streaming movies, etc.). Recently, there has been a significant interest towards the use of three-dimensional (3D) media such as 3D immersion and virtual reality video applications. Virtual reality videos are immersive videos mapped into a 3D geometry where a user can look around during playback using a virtual reality head-mounted display (HMD), which gives the viewer a sense of depth in every direction.

Despite recent advancements in virtual reality video technology, conventional systems face many challenges with delivering virtual reality content at high-quality levels. Virtual reality videos, which often include 360-degree videos, can be extremely bandwidth intensive and difficult to stream at acceptable quality levels. Accordingly, a major challenge with virtual reality video technology is how to efficiently transmit the large virtual reality video streams that require high bit rates to bandwidth-constrained devices, such as a wireless virtual reality HMD. For example, 4K video resolution is beginning to be viewed as a functional minimum resolution for current virtual reality video systems, while future virtual reality video systems anticipate 8K, 12K, and higher resolutions. Conventional systems, however, struggle to stream at acceptable quality levels even given the current resolutions.

In response to this issue, many conventional systems restrict streams to lower resolutions compared with their two-dimensional (2D) counterparts. Other conventional systems stream virtual reality video using a large range of predetermined resolutions for different portions of each virtual reality video. However, this requires a large storage capacity as each portion needs to be saved at multiple resolutions, a solution that is not feasible as resolutions for virtual reality videos increase. Further, some conventional systems disregard virtual reality video streaming standards, which inhibits streaming across multiple types of virtual reality video devices (e.g., HMDs). These and other problems exist with regard to conventional virtual reality systems.

BRIEF SUMMARY

One or more embodiments of the present disclosure provide benefits and/or solve one or more of the preceding or other problems in the art with systems and methods that stream high-performance virtual reality video using adaptive rate allocation. In particular, in one or more embodiments, the disclosed systems and methods partition a panorama video into segments and/or tiles. The systems and methods then assign priorities to each segment and/or tile. Further, the systems and methods stream each segment and/or tile to the user client device based on the assigned priorities. In this manner, the systems and methods deliver higher quality content to regions in the video where a user is currently looking/most likely to look as well as deliver lower quality content to regions outside of the user's view. By so doing, the systems and methods provide significant bandwidth savings.

To further explain, in one or more embodiments, the disclosed systems and methods receive a panorama video to stream to a user client device. The disclosed systems and methods then partition the panorama video into tiles that geometrically align with each other within the panorama video. Next, the disclosed systems and methods receive an indication from a client device that indicates a viewport (e.g., viewport information or a field-of-view) shown within the panorama video (i.e., what the user is looking at within the panorama video). Moreover, the disclosed systems and methods assign priorities to each of the tiles based on the viewport information. Further, the systems and methods determine or allocate, for each tile, a bit rate that corresponds to the priority assigned to the tile. The systems and methods then stream each tile to the client device using the bit rate allocated for the given tile.

Furthermore, the disclosed systems and methods can employ adaptive bit rate allocation to maximize bandwidth efficiency and video quality. For example, in one or more embodiments, the disclosed systems and methods determine a minimum video quality and corresponding bit rate needed to stream all the tiles of the panorama video to the user client device. Then, using the additional available bandwidth, the disclosed systems and methods heuristically allocate rates to tiles based on field-of-view priorities until a bandwidth limit is reached and bandwidth efficiency (e.g., throughput) with the client device is maximized.

Accordingly, the disclosed systems and methods herein achieve a balance between the demand for high-quality virtual reality video and limited bandwidth with minimal negative impact on a user's experience. As described in detail below, the disclosed systems and methods provide a semantic link between a user's viewport (e.g., field-of-view), spatial virtual reality video partitioning, and stream prioritization to facilitate bandwidth management and high-performance virtual reality video streaming.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings listed below.

FIG. 2 illustrates an example spherical video (both 3D and flat) having a viewport.

FIGS. 3A-3B illustrate an example spherical video partitioned into 3D mesh segments or tiles in accordance with one or more embodiments.

FIG. 4 illustrates an example spherical video partitioned into six hexaface sphere tiles in accordance with one or more embodiments.

FIGS. 5A-5B illustrate an example spherical video being assigned priority based on user input (e.g., a viewport) from a user client device in accordance with one or more embodiments.

DETAILED DESCRIPTION

Figure 1:
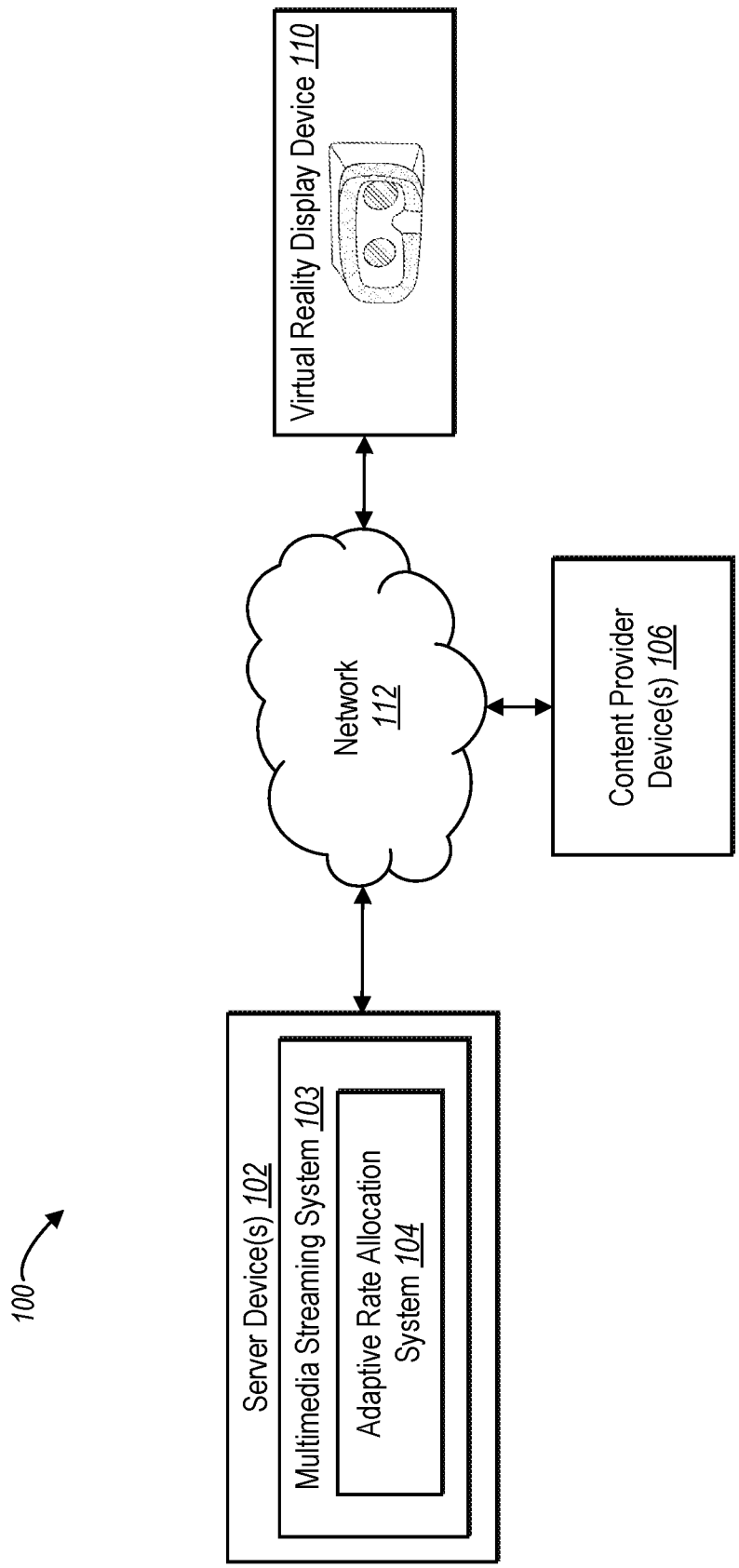
FIG. 1 illustrates a schematic diagram illustrating an exemplary environment in which an adaptive rate allocation system may be implemented in accordance with one or more embodiments.

One or more embodiments of the present disclosure include an adaptive rate allocation system that provides bandwidth management to achieve high-performance virtual reality video streaming. In particular, in one or more embodiments, the adaptive rate allocation system divides a virtual reality panorama video into multiple segments, prioritizes each segment based on a user's current field-of-view, and streams each segment based on the segment's priority and a corresponding rate allocation. In this manner, the adaptive rate allocation system improves streaming of the virtual reality panorama video beyond that of the conventional systems. Further, the adaptive rate allocation system delivers higher quality content to regions in the panorama video where a user is currently looking/most likely to look as well as lower quality content to regions outside of the user's view.

To illustrate, the adaptive rate allocation system accesses or receives a virtual reality panorama video (or simply "panorama video") that will be streamed to a client device (e.g., a virtual reality display device). The adaptive rate allocation system partitions the panorama video into segments, such as tiles, that geometrically align within the panorama video. Next, the adaptive rate allocation system receives viewport information from the client device that indicates a current position of the viewport (e.g., field-of-view) within the panorama video. Based on the viewport information, the adaptive rate allocation system assigns priorities to each of the segments. For example, the adaptive rate allocation system assigns a higher priority to segments that overlap with the viewport or are adjacent to the viewport than to segments located farther away from the viewport. Further, the adaptive rate allocation system determines a rate (e.g., bit rate) for each segment that corresponds to the assigned priority. The adaptive rate allocation system then streams each segment to the client device at the corresponding rate.

As mentioned above, the adaptive rate allocation system can determine a rate (e.g., bit rate) for each panorama video segment with an assigned priority. The determined rate then dictates how the segment is streamed to the client device. In one or more embodiments, the adaptive rate allocation system employs a rate allocation heuristic algorithm to determine the rate for each segment. As previously mentioned, bandwidth resources are often limited, especially when the client device wirelessly receives the panorama video. As such, the adaptive rate allocation system utilizes adaptive rate allocation to maximize bandwidth efficiency and video quality.

To illustrate, the adaptive rate allocation system determines a minimum acceptable video quality for sending a panorama video to the client device. The adaptive rate allocation system also determines a minimum bit rate that corresponds to the minimum acceptable video quality. The adaptive rate allocation system then identifies the amount of bandwidth needed to stream each segment at the minimum bit rate (e.g., at the minimum acceptable video quality). Often there is additional bandwidth beyond the minimum bit rate. As such, the adaptive rate allocation system identifies the amount of additional bandwidth between a bandwidth limit or budget and the minimum bit rate. Using the additional bandwidth, the adaptive rate allocation system can stream select segments at higher video qualities to the client device.

In some example embodiments, the adaptive rate allocation system determines which segments to stream at a higher video quality (e.g., a higher bit rate) based on the segment's assigned priority. As described further below, the adaptive rate allocation system assigns priority to segments based on where a user is looking (i.e., viewport) and where the user is likely to look next. For instance, the adaptive rate allocation system streams segments with the highest assigned priority at the highest bit rate when enough additional bandwidth is available such that the user's current view is presented to the user at the highest video quality. Likewise, the adaptive rate allocation system can stream other segments with other assigned priorities at various bit rate levels (which correspond to video quality levels) based on the amount of available additional bandwidth. In this manner, the adaptive rate allocation system determines how to stream the highest quality video possible while maximizing bandwidth efficiency.

As mentioned above, in some example embodiments, the adaptive rate allocation system divides a panorama video into tiles. For example, the adaptive rate allocation system partitions a panorama video into hexaface spaces that includes a top tile, a bottom tile, and four middle body tiles. For instance, if the panorama video is a spherical video (e.g., a 360-degree video), the adaptive rate allocation system partitions the panorama video into a hexaface sphere, which is illustrated and described in greater detail below in reference to FIG. 3B. Using the tiles in the hexaface spaces, the adaptive rate allocation system assigns priorities based on the tile or tiles the user is currently viewing as indicated by the viewport. The adaptive rate allocation system can then determine the bit rate at which to stream each tile based on the combination of a tile's assigned priority and available bandwidth.

As mentioned, the adaptive rate allocation system can assign priority to tiles based on the viewport. The viewport provides an indication of a user's field-of-view as well as the user's viewing direction within a panorama video. For example, in one or more embodiments, the adaptive rate allocation system assigns the highest priority to segments that overlap with the viewport. In addition, the adaptive rate allocation system assigns a next highest priority to segments that are adjacent to the viewport and a lower priority to segments farther away from the viewport. In some example embodiments, the adaptive rate allocation system assigns priority based on where a user is likely to look next (e.g., an anticipated future position of the viewport). For instance, the adaptive rate allocation system assigns a lower priority to a segment that includes the sky (e.g., the top tile), where the user is not likely to look.

In some example embodiments, the adaptive rate allocation system can add one or more digital enhancements into a segment before streaming the segment to a client device. For example, the adaptive rate allocation system can inject an interactive 3D object within the spherical video. As another example, the adaptive rate allocation system enhances the spherical video with an advertisement intelligently placed within a segment or tile.

As briefly described above, the media attribution system provides a number of advantages over conventional systems. For example, the adaptive rate allocation system provides improved bandwidth management while providing high-quality virtual reality video to a user, which improves the user's virtual reality experience. In particular, the adaptive rate allocation system improves the efficiency of transmitting and streaming a spherical video to a client device. In some embodiments, the improved bandwidth efficiency resulted in a bandwidth savings of up to 72% compared to baseline cases.

Because the adaptive rate allocation system improves efficiencies in streaming a spherical video, the adaptive rate allocation system results in less overall data processing and computing resources needed on both the server device transmitting the spherical video and the client device receiving the video. For example, the server device transmits, and the client device receives segments based on the user's current field-of-view within the spherical video. In other words, the adaptive rate allocation system enables the server device to more quickly search, locate, and send the segments that are currently most significant to the user. In addition, the client device receives and processes segments that are most significant to the user in the moment, which reduces load and processing resources needed on the client device (which are often limited). Further, these benefits compound exponentially as the adaptive rate allocation system constantly repeats these actions through the user's entire streaming experience.

As another benefit, the adaptive rate allocation system provides more flexibility. In particular, the adaptive rate allocation system functions using known standards, such as dynamic adaptive streaming over HTTP (DASH). As such, the adaptive rate allocation system functions across most types of virtual reality display devices. In this manner, the adaptive rate allocation system enables the systems and methods described below to operate on most client devices, as opposed to conventional systems that require the user obtain a proprietary type of client device. Additional benefits, advantages, features, and characteristics of the adaptive rate allocation system are described below with respect to the figures, which describe one or more embodiments of the adaptive rate allocation system.

Referring now to the Figures, FIG. 1 illustrates a schematic diagram illustrating an exemplary environment 100 in which an adaptive rate allocation system 104 can operate. As shown, the exemplary environment 100 includes one or more server devices 102 hosting a multimedia streaming system 103 of which the adaptive rate allocation system 104 can form part of to aid in efficient streaming. The environment 100 can optionally include one or more content provider devices 106, and a client device (i.e., a virtual reality display device 110). The one or more server devices 102, one or more content provider devices 106 and the virtual reality display device 110 can communicate with each other through a network 112, which represents any suitable network over which the computing devices can communicate. Example networks are discussed in more detail below with regard to FIG. 10.

As just mentioned, the environment 100 includes the one or more server devices 102. The one or more server devices 102 may generate, store, receive, and transmit any type of data, including virtual reality content and user input. For example, the one or more server devices 102 transmit data to client devices, such as the virtual reality display device 110. In one example embodiment, the one or more server devices 102 include a content server. In some example embodiments, the one or more server devices 102 include a communication server or a web-hosting server. In addition, the one or more server devices 102 can include one or more of the computing devices described below in relation to FIG. 10.

As illustrated in FIG. 1, the one or more server devices 102 include a multimedia streaming system 103. The one or more server devices 102 can include all, or a portion of, the multimedia streaming system 103. The multimedia streaming system 103 can comprise an application running on the one or more server devices 102 or a portion of a software application that can be downloaded from one or more server devices 102. For example, the multimedia streaming system 103 includes a web hosting application that allows the client devices to interact with content hosted on the one or more server devices 102. To illustrate, in one or more embodiments of the environment 100, the virtual reality display device 110 accesses a web page that provides a virtual reality experience (e.g., includes a spherical video) supported by the one or more server devices 102. The virtual reality display device 110 runs an application to allow a user to access, view, and/or interact with a content hosted on the one or more server devices 102. Example multimedia streaming systems 103 include video streaming services, television streaming services, video game streaming services, etc.

In addition, the multimedia streaming system 103 can comprise the adaptive rate allocation system 104. The adaptive rate allocation system 104 can allow the multimedia streaming system 103 to efficiently stream virtual reality content to client devices. The term "virtual reality content" as used herein refers to information capable of being presented to a user via a virtual reality display device. In particular, the term "virtual reality content" includes digital content presented in a spherical video. Accordingly, in one or more embodiments, virtual reality content refers to an image or a video that includes a field-of-view that extends beyond the typical field-of-view of a pair of human eyes (e.g., 180 degrees). In some embodiments, virtual reality content includes 360-degree audio-visual content or, in other words, content with 360 degrees of a horizontal field-of-view. Virtual reality content items can include a digital image, video, web site, web page, user interface, menu item tool menu, magazine, slideshow, animation, social post, comment, blog, data feed, audio, advertisement, vector graphic, bitmap, document, any combination of one or more of the preceding, or other electronic content.

The terms "panorama video" or "immersive video" generally refers to a video that has an enlarged field-of-view (e.g., horizontally, vertically, or diagonally) than can be displayed at one time on a virtual reality display. As used herein, a panorama video portrays greater than 180 degrees of a horizontal field-of-view and greater than 90 degrees of a vertical field-of-view. For instance, a spherical video or 360-degree video is an example of a panorama video. In addition, a panorama video includes video captured by one or more digital camera that portrays a representation of content in front of, behind, and to the sides of the digital cameras. Alternatively, in one or more embodiments, a panorama video refers to a set of multiple videos (e.g., captured by one or more multiple digital cameras) that are combined or stitched together to provide an enlarged field-of-view.

The multimedia streaming system 103 and the adaptive rate allocation system 104 can comprise computer-executable instructions that, when executed by the one or more server devices 102, client device 108, and/or virtual reality display device 110 cause the corresponding computing device to perform a number of actions, as discussed in more detail below.

Moreover, as shown in FIG. 1, the environment 100 also optionally includes one or more content provider devices 106. The one or more content provider devices 106 can include a variety of computing devices. In particular, the one or more content provider devices 106 can include computing devices operable to generate virtual reality content. For example, the one or more content provider devices 106 include one or more computing devices that provide spherical videos or other virtual reality content. The one or more content provider devices 106 can comprise one or more computing devices described below in connection with FIG. 10. The content provider devices 106 can provide content to the multimedia streaming system 103 to stream to client devices. For example, in one or more embodiments, the multimedia streaming system 103 is a third-party service that assists a content provider in distributing content.

As illustrated in FIG. 1, the environment 100 includes a virtual reality display device 110. The virtual reality display device 110 is a client device and can comprise various computing devices. For instance, in one or more embodiments, the virtual reality display device 110 includes one or more computing devices described below in relation to FIG. 10.

More particularly, the term "virtual reality display device" refers to a computing device that generates a digital, 3D representation of a virtual environment. For purposes of explanation, the term "virtual environment" refers to a simulation of a physical presence in a setting or location (real or imagined, regardless of size). For example, a virtual environment can comprise a simulation of a physical presence in a building, a city, a market, a forest, a planet, outer space, a cell, or a particle.

A virtual reality display devices includes a computing device (e.g., a headset or head-mounted display, cell phone, computer, tablet, laptop) that generates a digital, 3D view of a virtual environment that simulates a user's physical presence through a generated sensory experience (e.g., immersive visual display, speakers, etc.). To illustrate, a virtual reality display device can include a head-mounted display that generates an immersive 3D representation of a virtual environment that modifies a view of the virtual environment based on user movements to simulate physical presence in the virtual environment. Moreover, a virtual reality display device can also comprise one or more sensors that detect user interaction. For example, a virtual reality display device can comprise optical sensors, clothing, gloves, or other sensors to detect movements and/or hand gestures of a user. Similarly, the virtual reality display device can comprise a user input device, such as a controller, remote control, joystick, keyboard, voice command device.

In some example embodiments, the virtual reality display device 110 comprises a computing device (computer, set top box, gaming console, etc.) and a separate headset, such as a wired or wireless head mounted display. In other embodiments, the virtual reality display device 110 comprises a device with an integrated display. The virtual reality display device 110 provides a view of a virtual environment via the head-mounted display and modifies the view of the virtual environment based on user movements to simulate physical presence in the virtual environment.

Although FIG. 1 illustrates a particular arrangement of the devices, various additional arrangements are possible. For example, while FIG. 1 illustrates a single client device 108, in one or more embodiments, the environment 100 includes multiple client devices each having a virtual reality display. In another example, the client device 108 communicates directly with the one or more server devices 102, bypassing the network 112.

Similarly, although the environment 100 of FIG. 1 is depicted as having various components, the environment 100 may have additional or alternative components. For example, the adaptive rate allocation system 104 can be implemented on a single computing device. Alternatively, the adaptive rate allocation system 104 may be implemented across multiple devices or components. Furthermore, the adaptive rate allocation system 104 can operate on a separate device from the multimedia streaming system 103.

By way of example, in one or more embodiments, the multimedia streaming system 103 identifies virtual reality content (i.e., a panorama video) to stream to the virtual reality display device 110. For instance, the adaptive rate allocation system 104 accesses a spherical video from the virtual reality content. The adaptive rate allocation system 104 partitions the spherical video into segments, such as a hexaface sphere comprising six tiles (e.g., a top tile, a bottom tile, and four middle body tiles). For each tile, the adaptive rate allocation system 104 generates various video quality levels that correspond to streaming the tiles at different bit rates. While some embodiments include dividing a spherical video into a hexaface sphere having six tiles, other embodiments can include other types of panorama videos into six or different numbers of tiles. Still further, one or more embodiments can involve dividing a spherical video into more or less than six tiles. Similarly, in one or more embodiments, the adaptive rate allocation system can assign any number of classes and/or bit rates to each tile. For example, the adaptive rate allocation system assigns each tile as one of four priority classes. Alternatively, the adaptive rate allocation system employs a set of twelve priority classes or another number of priority classes.

Continuing the above example, the one or more server devices 102 receive input from the client device that indicates the viewport. As used herein, the term "viewport" refers to a field-of-view displayed to a user within a virtual reality display. As such, a virtual reality display shows both a portion of the virtual reality content within a viewport (e.g., a displayed portion) and virtual reality content outside the viewport (e.g., a peripheral portion). Stated differently, a virtual reality display includes both portions that are currently visible within the viewport and in front of the user as well as portions of the virtual reality content to the side and behind the user that are beyond the field-of-view associated with the viewport. A viewport can include information that indicates the position of the viewport, such as the coordinates of the viewport within the spherical video. As such, the viewport information indicates the displayed portion and the peripheral portion, with respect to the spherical video.

Based on the viewport, the adaptive rate allocation system 104 assigns priorities to each tile in the hexaface sphere. In addition, the adaptive rate allocation system 104 determines the bit rate at which to stream each tile based on each tile's assigned priority and the available bandwidth. Then, the one or more server devices 102 stream each of the tiles to the client device 108 at the bit rate determined by the adaptive rate allocation system 104. In a number of embodiments, the adaptive rate allocation system divides a spherical video into segments or tiles before receiving the viewport information. Further, in some example embodiments, the adaptive rate allocation system can generate and store various quality levels for each tile. Alternatively, the adaptive rate allocation system partitions and generates segments for a spherical video in real-time based on the position of viewport.

Turning now to FIG. 2, which illustrates how a spherical video is mapped from a 3D sphere to a 2D flat image. In particular, FIG. 2 illustrates an example of a spherical video shown as both a 3D sphere 202a and a mapped 2D flat image 202b. In addition, FIG. 2 includes a viewport 204a shown in the 3D sphere 202a and a corresponding viewport 204b shown in the 2D flat image 202b.

As mentioned above, a spherical video (e.g., a 360-degree video) is an embodiment of a panorama video. For ease of explanation, FIGS. 2-7 are described in terms of spherical videos. One will appreciate, however, that the techniques, principles, and actions described with respect to spherical videos equally apply to other types of panorama videos. Likewise, FIGS. 2-7 describe hexaface spheres. One will also appreciate that the techniques, principles, and action described with respect to hexaface spheres equally apply to other configurations of tiles or even hexaface shapes.

As a brief overview, a spherical video provides an immersive experience to a user by employing texturing. The adaptive rate allocation system 104 uses textures to provide a surface wrapping for a 3D object mesh, with 3D textures being a logical extension of the traditional 2D textures. Spherical videos are created by mapping a spherical video as a 3D texture onto a 3D geometry mesh, often a sphere, with the user at the center of that geometry. Accordingly, FIG. 2 shows the 3D sphere 202a of a given frame of a spherical video where a box 206 represents the position of the user. As a note, while FIG. 2 illustrates a given frame of a spherical video, the same concepts and principles described herein apply to spherical videos having any number of frames.

As shown in the 3D sphere 202a, the viewport 204a represent a 90-degree viewing angle in both the vertical and horizontal directions. For example, the box 206 at the center of the 3D sphere 202a represents a user's orientation, and the viewport 204a represents the direction the user is facing. More specifically, the box 206 represents the position of a virtual reality display through which the user views the spherical video. Accordingly, as the orientation and/or attitude of the box 206 changes (e.g., the user shifts the position of the virtual reality display), the location of the viewport 204a on the 3D sphere 202a also changes, which results in changing what the user is viewing within the spherical video.

Likewise, the viewport 204b in the 2D flat image 202b represents the same 90-degree viewing angle on the mapped to the 2D flat image 202b. Because the viewport 204b captures only a portion of the total available content of the spherical video (e.g., 90 degrees of 360 degrees), the user is free to move about the spherical video to view additional content as the spherical video plays. As the user changes their view within the spherical video, the location of the viewport 204b moves within the 2D flat image 202b. For example, the viewport 204b moves left/right and up/down within the 2D flat image 202b in response to the user changing the position of the virtual reality display through which the user views the spherical video.

In some example embodiments, the viewport is larger than a 90-degree viewing angle, such as a 96-degree viewing angle, or smaller than the 90-degree viewing angle. In addition, while the viewport 204b is shown as a square, in some example embodiments, the viewport is a rectangle, oval, overlapping circles, or another shape. Further, while only one viewport is described, which includes the full field-of-view available to a user through a virtual reality display when the user is viewing virtual reality content in stereo (e.g., in 3D), one will appreciate that some embodiments include a separate viewport for each stereo stream of a 3D virtual reality spherical video.

As mentioned above, the adaptive rate allocation system 104 can receive information about the position and orientation of the viewport (e.g., viewport information) within the spherical video. As an overview of viewport tracking, viewport orientation is commonly defined using rotation with respect to the x-axis, y-axis, and z-axis using Euler angles. Another method involves using a quaternion, which employs a unit rotation matrix. In particular, a quaternion consists of two sets of values: first, a set consisting of a [x, y, z] tuple representing the axis about which the device rotation occurs, and second, a w component representing the amount of rotation that will occur about this axis. Using these four values, the adaptive rate allocation system 104 can accurately describe device orientation while avoiding problems such as gimbal lock.

More specifically, to track a viewport, the adaptive rate allocation system 104 creates valid confines of unit quaternions specifically set for each of the hexaface sphere 3D mesh segments, using the following three steps. First, the adaptive rate allocation system 104 converts Euler angles to a unit quaternion representation for virtual reality display orientation tracking. Next, the adaptive rate allocation system 104 calculates an array corresponding to a normalized direction vector from each quaternion. Lastly, the adaptive rate allocation system 104 combines the values together to compute the confines of segment-specific quaternion representations inside the hexaface sphere (i.e., hexaface spaces). In this manner, the adaptive rate allocation system 104 can identify which 3D mesh segment or tile a user's viewport is facing as well as movements of the viewport as the spherical video plays.

Turning now to FIGS. 3A and 3B, additional detail will be provided regarding generating segments for a spherical video in accordance with one or more embodiments. In particular, FIGS. 3A and 3B illustrate an example spherical video being partitioned into 3D mesh segments or tiles. For example, FIG. 3A shows a 3D sphere mesh 302a divided into multiple mesh segments 304a-c. Then, using the segments, the adaptive rate allocation system 104 can further partition the mesh into tiles. For instance, the adaptive rate allocation system 104 can generate a hexaface sphere 302b based on the 3D mesh segments, as described below.

Before describing the process of the adaptive rate allocation system 104 generating a hexaface sphere including tiles, an overview of generating the 3D sphere mesh 302a is given. In one or more embodiments, the adaptive rate allocation system 104 generates the 3D sphere mesh 302a based on a quality parameter. The quality parameter can account for a trade-off between smoothness and rendering speed. For example, when the quality parameter indicates increased smoothness, the spherical video renders more triangles, which produces a higher quality spherical video. When the quality parameter indicates a faster rendering speed, the spherical video renders fewer triangles, causing the spherical video to appear chunkier and less smooth.

Specifically, the quality parameter is a combination of two subparameters that together control the smoothness of the sphere. The first sub-parameter is the number of slices, which represent the number of vertical cuts (e.g., vertical grid lines) through the spherical video. The second sub-factor is the number of stacks, which represents the number of horizontal cuts (e.g., horizontal grid lines) through the spherical video.

Listing 1 below provides pseudo-code for creating the 3D sphere mesh 302a. One will appreciate that other methods are available for creating the 3D sphere mesh 302a. Further, in embodiments where the panorama video is not a spherical video (e.g., the panorama video has a 180-degree or 270-degree horizontal field-of-view), the adaptive rate allocation system 104 can apply similar techniques as provided below with respect to a spherical video. For instance, the adaptive rate allocation system 104 creates a full 3D sphere mesh, then disregards or drops portions of the 3D mesh where no content exists. In another instance, the adaptive rate allocation system 104 first reduces the 3D mesh calculations to fit the field-of-view of the panorama video.

---
Listing 1
Generating a 3D Sphere Mesh
---

M: the number of stacks
N: the number of slices
For all m: $0 \leq m \leq M$ and for all n:$0 \leq n \leq N - 1$, calculate and store a spatial point
P(x, y, z) such that:
　　$P_x \leftarrow \text{Sin}(\pi \times m / M) \cdot \text{Cos}(2\pi \times n / N)$,
　　$P_y \leftarrow \text{Sin}(\pi \times m / M) \cdot \text{Sin}(2\pi \times n / N)$, and
　　$P_z \leftarrow \text{Cos}(\pi \times m / M)$.
Then, draw line segments between each vertex to generate the 3D sphere mesh.

---

As mentioned above, the quality parameter balances a tradeoff between quality (i.e., smoothness) and rendering speed. For example, using too many stacks and slices exhausts hardware resources such as memory used for graphics processing unit (GPU)-assisted video rendering, which can lead to lower performance without much improvement in quality. On the other hand, too little stacks and slices result in blocky and grainy quality. Accordingly, the adaptive rate allocation system 104 initially selects a higher quality parameter, but can adaptively reduce the quality parameter as hardware resources become unavailable. In this manner, the adaptive rate allocation system 104 achieves a balance between maximizing available computing resources to provide the highest quality of spherical video possible while not overburdening the computing device.

Using the 3D sphere mesh 302a, the adaptive rate allocation system 104 can generate 3D mesh segments 304a-c. As shown in FIG. 3A, the adaptive rate allocation system 104 partitions the 3D sphere mesh 302a into multiple different 3D meshes, in a two-step process. In the first step, the adaptive rate allocation system 104 splits the sphere into three major parts: a top cap, a middle body, and a bottom cap. The top cap includes meshes from the top point of the sphere (i.e., the top pole) to the top cap stack 306 of the middle body (+β°). The middle body includes meshes stretching between the bottom mesh cap 308 and the top cap stack (−β°). The bottom cap includes meshes triangles from the bottom mesh cap 308 to the bottom point of the sphere (i.e., the bottom pole). In this manner, the adaptive rate allocation system 104 creates the top mesh segment 304a, the middle body mesh segment 304b, and the bottom mesh segment 304c.

In the second step, the adaptive rate allocation system 104 further divides the middle body into multiple 3D meshes. In particular, the adaptive rate allocation system 104 splits the middle body mesh segment 304b into additional mesh segments. For example, the adaptive rate allocation system 104 divides the middle body mesh segment 304b into two or more equal sizes. For instance, if the middle body mesh segment 304b is a 360-degree segment, the adaptive rate allocation system 104 divides each additional segment into 120-degree, 90-degree, 60-degree, or 30-degree segments. Stated differently, the adaptive rate allocation system 104 divides each additional mesh segment to cover α°, where α° is a factor of the total middle body mesh segment 304b (e.g., 30°, 60°, 90°, or 120°). Alternatively, the adaptive rate allocation system 104 asymmetrically divides the additional mesh segments from the middle body mesh segment 304b.

As mentioned above, in one or more embodiments, the adaptive rate allocation system 104 creates a hexaface sphere that includes tiles of the spherical video. To illustrate, FIG. 3B shows a hexaface sphere 302b that include six hexaface sphere tiles 310a-c. In particular, FIG. 3B shows a top tile 310a, four middle body tiles 310b, and a bottom tile 310c.

To form the hexaface sphere 302b, the adaptive rate allocation system 104 employs the following values for α° and β°, α°=π/2 and β°=π/4. However, one will appreciate that the adaptive rate allocation system 104 can employ other values of α° and β°. For example, the adaptive rate allocation system 104 chooses α° and β° based on the settings of the virtual reality display through which a user is viewing the spherical video. Further, because the tiling process is a general process, the same process can be applied to other geometrical projections besides a 3D sphere, such as a 3D cube, or when a panorama video is less than 360-degrees, as described previously.

FIG. 4 illustrates an example 2D mapping of a spherical video partitioned into six hexaface sphere tiles. As shown, the partitioned spherical video 402 include the six hexaface sphere tiles 310a-c, described with regard to FIGS. 3A-3B, spatially cropped. Namely, the partitioned spherical video 402 in FIG. 4 illustrates the top tile 310a, the four middle body tiles 310b, and the bottom tile 310c. While the partitioned spherical video 402 include only six tiles, one will appreciate that the adaptive rate allocation system 104 can generate more or fewer tiles. For example, the adaptive rate allocation system 104 generates two bottom tiles or two middle body tiles.

In some example embodiments, the adaptive rate allocation system 104 employs a spatial relationship description, such as MPEG-DASH SRD (described below) to partition the segments. In this manner, the adaptive rate allocation system 104 can divide the tiles in a logical and organized fashion. In addition, the spatial relationship description enables the adaptive rate allocation system 104 to identify the position of each tile with respect to each other tile and the spherical video as a whole.

Figure 6:
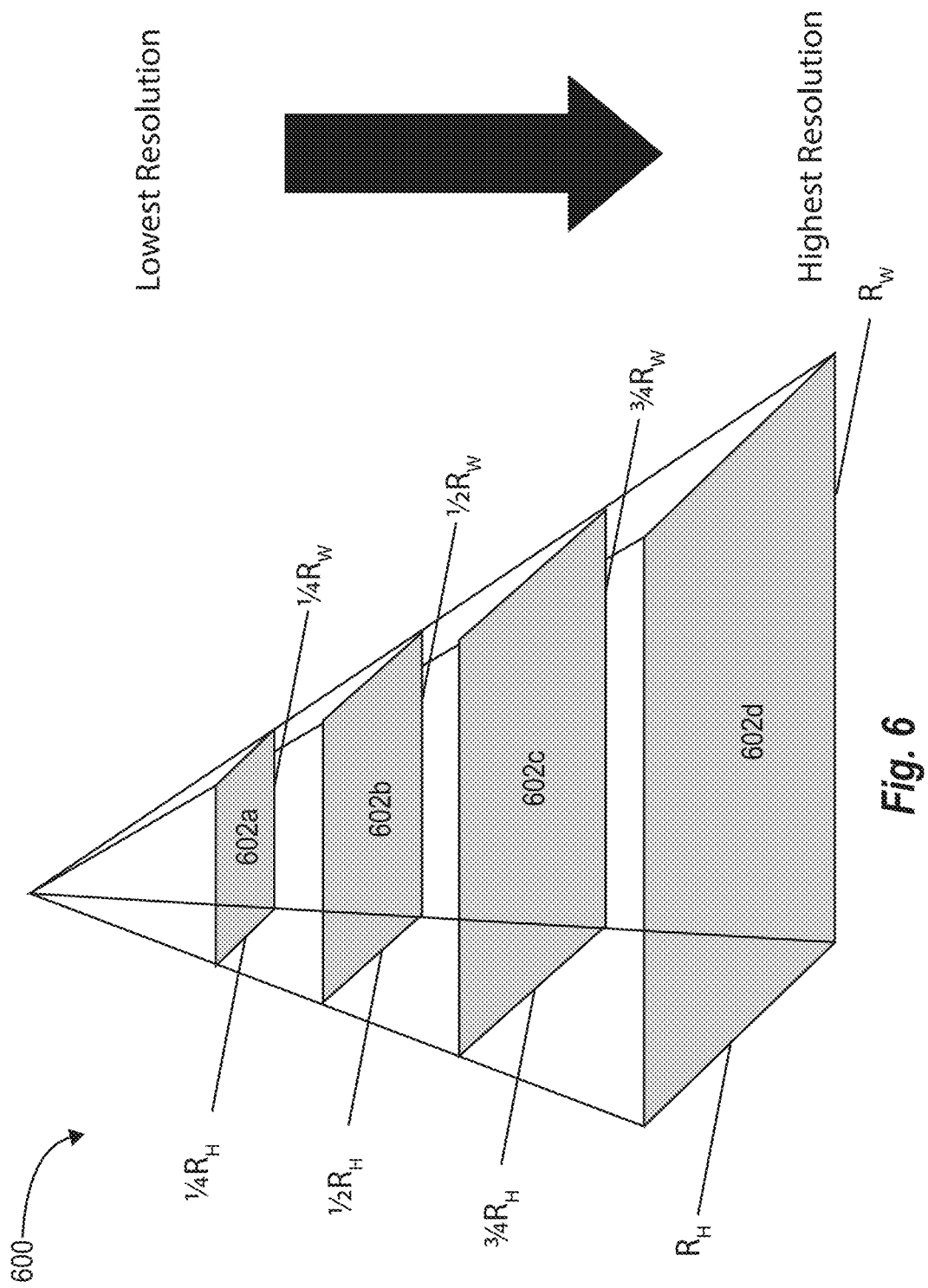
FIG. 6 illustrates an example diagram of different resolutions that the adaptive rate allocation system employs to stream tiles of a spherical video to a client device in accordance with one or more embodiments.

Turning now to FIGS. 5A, 5B, and 6, additional description regarding determining an adaptive rate allocation for prioritized segment-based (e.g., tile-based) spherical video streaming will now be provided. In particular, FIGS. 5A-5B illustrate an example spherical video 502 being assigned priority based the user's viewport. FIG. 6 illustrates an example diagram of using different resolutions for each mesh segment (e.g., tile) of the spherical video 502.

As an overview, FIGS. 5A and 5B divides a spherical video 502, shown as a 2D flat image, into multiple (i.e., twenty) tiles 506. While the spherical video 502 shown in FIGS. 5A-5B is displayed as a 2D flat image for ease of explanation, one will appreciate that the concepts and principles described herein also apply to a corresponding 3D spherical video. For example, the adaptive rate allocation system 104 divides the 3D sphere mesh into twenty tiles. Moreover, while the 2D flat image of the spherical video 502 includes more tiles than included in the hexaface sphere, one will appreciate that the concepts and principles described with respect to the tiles in FIGS. 5-6 equally apply to the tiles in a hexaface sphere or hexaface spaces having any number of 3D mesh segments.

As mentioned above, FIG. 5A illustrates the adaptive rate allocation system 104 assigning priorities to tiles 506 within the spherical video 502. In one or more embodiments, the adaptive rate allocation system 104 assigns priorities based on the viewport 504. For example, the adaptive rate allocation system 104 assigns higher priority (e.g., $P_1$) to tiles within the immediate viewport and a lower priority (e.g., $P_2$ and $P_3$) to the tiles in the area outside the viewport in the spherical video 502.

To illustrate, the adaptive rate allocation system 104 receives, from a client device, viewport information that indicates the location of the viewport 504 within the spherical video 502. As shown, the viewport 504 is located near the center of the spherical video 502. As such, the adaptive rate allocation system 104 assigns the tile that includes the viewport 504 with the highest priority (e.g., $P_1$). In addition, the adaptive rate allocation system 104 assigns tiles adjacent to the viewport 504 with a next highest priority (e.g., $P_2$) because the proximity of those tiles to the viewport 504 and the likelihood that the user will view those tiles next. Lastly, as shown, the adaptive rate allocation system 104 assigns a low priority (e.g., $P_3$) to tiles located farther away from the viewport 504, thus, less likely for a user to view those tiles next. While three priority classes (e.g., $P_1$, $P_2$ and $P_3$) are shown, the adaptive rate allocation system 104 can employ any number of priority classes when assigning priorities to the tiles 506.

As described above, the adaptive rate allocation system 104 can assign priority to tiles based on proximity of the tile to the viewport 504. In some embodiments, the adaptive rate allocation system 104 assigns priority based on the location of the tile within the spherical video 502. For example, as shown in FIG. 5B, the adaptive rate allocation system 104 assigns tiles across the top of the spherical video 502 with the lowest priority (e.g., $P_3$) based on the low probability that the user looks upwards in the spherical video 502.

In some example embodiments, the adaptive rate allocation system 104 assigns priorities to tiles based on virtual reality content within the tile. For example, the adaptive rate allocation system 104 assigns a high priority to a tile containing an advertisement even though the tile is located away from the viewport 504. As another example, the adaptive rate allocation system 104 assigns tiles across the top of the spherical video 502 with the lowest priority based on the lack of content within those tiles (e.g., only blue/gray sky). One will appreciate that the adaptive rate allocation system 104 can assign tile priority based on a combination of embodiments described above.

As mentioned above, the adaptive rate allocation system 104 assigns priorities to tiles based on where a user is likely to look next (e.g., an anticipated future position of the viewport). Assigning higher priorities to where the user is likely to look next can be particularly helpful when the future anticipated tiles are not within or adjacent to the user's current viewport (i.e., field-of-view). To demonstrate, in some embodiments, the adaptive rate allocation system 104 follows a script/story framework that provides an indication of where future events (e.g., action, movement, or anticipated user-interaction) will occur within the panorama video. In this manner, the adaptive rate allocation system 104 assigns a higher priority to tiles that encompass future events. The level to which the adaptive rate allocation system 104 elevates a tile's priority can be further based on a significance value associated with each event.

Likewise, in one or more embodiments, the adaptive rate allocation system 104 assigns priorities to tiles based on object detection. For example, the adaptive rate allocation system 104 identifies the position of objects within a panorama video (in the current or future frames of the video). Based on the object's characteristics (e.g., size, position, movement, relevance to a future event, or potential interest level), the adaptive rate allocation system 104 can increase the priority of a tile to which the object belongs.

As mentioned above, the adaptive rate allocation system 104 pre-divides the spherical video 502 into tiles 506 before receiving input regarding the location of the viewport 504 within the spherical video 502. As such, the viewport 504 will often overlap multiple tiles. When the viewport 504 overlaps multiple tiles 506, the adaptive rate allocation system 104 can assign the same priority to multiple tiles. For example, FIG. 5B illustrates the adaptive rate allocation system 104 assigning the highest priority of $P_1$ to four tiles that overlap with the viewport 504.

In some example embodiments, the adaptive rate allocation system 104 merges the tiles overlapping with the viewport 504. For example, as shown in FIG. 5B, the adaptive rate allocation system 104 merges the four tiles overlapping the viewport 504 into a single tile. For instance, the adaptive rate allocation system 104 treats the four tiles as a single tile for the purpose of rate allocation, which is described below. In this manner, the adaptive rate allocation system 104 can avoid edging problems due to quality variation of the tiles overlapping the viewport 504 and enable a smooth viewing experience.

Using the assigned priorities for each tile, the adaptive rate allocation system 104 can then selectively choose rates at which to stream each tile. In particular, the adaptive rate allocation system 104 allocates a bit rate for each tile based on the tile's assigned priority such that bandwidth efficiency is maximized. In this manner, the adaptive rate allocation system 104 can stream high-quality spherical video to virtual reality display devices that have limited bandwidth availability.

A detailed example of how the adaptive rate allocation system 104 can allocate rates for streaming a spherical video will now be given. One will appreciate that the adaptive rate allocation system 104 can employ other/additional methods, techniques, and processes to allocate rates for streaming a spherical video. In particular, while the following example provides one embodiment of the adaptive rate allocation system 104 allocating rates for streaming a spherical video, one will appreciate that other combinational optimization solutions can be used to solve this knapsack-like problem. For example, the adaptive rate allocation system 104 can use other multiple choice knapsack problem algorithms.

To optimally allocate rates to each tile within a spherical video, the adaptive rate allocation system 104 utilizes a bandwidth budget (i.e., the amount of available bandwidth) for a given virtual reality display device. In one or more embodiments, the virtual reality display device indicates the bandwidth limitations of the virtual reality display device. In other embodiments, the adaptive rate allocation system 104 communicates with the virtual reality display device to identify bandwidth limitations. For example, the adaptive rate allocation system 104 performs a series of download test with the virtual reality display device to identify the amount of available bandwidth. For purposes of explanation, the available bandwidth budget for a given virtual reality display device is represented as $W_B$. Further, in some example embodiments, the adaptive rate allocation system 104 updates bandwidth limitations on a regular basis to account for any changes to the bandwidth budget.

Upon the adaptive rate allocation system 104 obtaining the amount of available bandwidth for a given virtual reality display device (e.g., $W_B$), the adaptive rate allocation system 104 can then allocate rates for tiles of a spherical video to maximize bandwidth. Initially, the adaptive rate allocation system 104 determines the amount of bandwidth needed to stream each tile of the spherical video at the lowest quality level. In this manner, the adaptive rate allocation system 104 ensures that every tile of the spherical video will be transmitted to the virtual reality display device at a quality level that is minimally acceptable. Accordingly, the adaptive rate allocation system 104 determines the minimum bit rate that needed to stream all tiles at their lowest bit rates to the virtual reality display device, represented as $W_{Min}$.

As a note, the adaptive rate allocation system 104 generally associates quality with bit rate. Therefore, as the quality (e.g., resolution, number of rendered triangles, pixel density) of a tile increases, the bit rate needed to stream the tile also increases. In some example embodiments, however, the adaptive rate allocation system 104 can increase the bit rate of a tile without changing quality level.

Upon determining the minimum required bit rate (i.e., $W_{Min}$), the adaptive rate allocation system 104 identifies the amount of surplus bandwidth between the bandwidth budget (i.e., $W_B$) and the minimum required bit rate, which is represented as $W_S$. To illustrate, the adaptive rate allocation system 104 determines $W_S$ as:

$$W_B - W_{Min} = W_S.$$

The adaptive rate allocation system 104 then optimally allocates the surplus bandwidth (i.e., $W_S$) based on the priority assigned to the tiles. For example, in one or more embodiments, the adaptive rate allocation system 104 determines whether the surplus bandwidth enables sending tiles with the higher priority (e.g., tiles overlapping with the viewport) at a higher quality level. More specifically, the adaptive rate allocation system 104 determines whether the surplus bandwidth accommodates streaming one or more tiles at higher bit rates to the virtual reality display device.

To illustrate, the adaptive rate allocation system 104 identifies each tile that is assigned to the highest priority class, labeled with a $P_1$ in FIG. 5B. The adaptive rate allocation system 104 also determines the amount of bandwidth needed to stream the highest priority tiles at the highest quality level using the highest bit rate, represented as $W_{P1}$. With this information, the adaptive rate allocation system 104 determines whether the surplus bandwidth can accommodate streaming the highest priority tiles at the highest bit rate, or:

$$\text{If } W_S - W_{P1} \geq 0.$$

If the surplus bandwidth can accommodate streaming the highest priority tiles at the highest bit rate, then the adaptive rate allocation system 104 allocates the highest priority tiles with the highest bit rate. In addition, the adaptive rate allocation system 104 can further determine the amount of additional surplus bandwidth that remains after streaming the highest priority tiles, represented as $W_{S1}$. For example, the adaptive rate allocation system 104 determines $W_{S1}$ as:

$$W_S - W_{P1} = W_{S1}.$$

Using the additional surplus bandwidth (e.g., $W_{S1}$), the adaptive rate allocation system 104 determines whether additional tiles from the spherical video can also be streamed to the client device at the highest bit rate (i.e., the higher quality). For example, the adaptive rate allocation system 104 identifies each tile that is assigned to the next highest priority class, labeled with a $P_2$ in FIG. 5B. Similar to the description above, the adaptive rate allocation system 104 determines the amount of bandwidth needed to stream the next highest priority tiles at the highest quality level using highest bit rate, represented as $W_{P2}$. With this information, the adaptive rate allocation system 104 determines whether the additional surplus bandwidth can accommodate streaming the next highest priority tiles at the highest bit rate, or:

$$\text{If } W_{S1} - W_{P2} \geq 0.$$

If the surplus bandwidth can accommodate streaming the next highest priority tiles at the highest bit rate, then the adaptive rate allocation system 104 allocates the next highest priority tiles with the highest bit rate. The adaptive rate allocation system 104 continues the process of determining whether the remaining bandwidth can accommodate streaming lower priority tiles at the highest quality level using the highest bit rate. If the adaptive rate allocation system 104 determines that each of the tiles in the spherical video can be streamed using the highest bit rate, then the adaptive rate allocation system 104 allocates the tiles as such and begins streaming the tiles to the virtual reality display device according to the bit rate allocations for each tile.

In many cases, however, due to the limited bandwidth budgets of virtual reality display device, the adaptive rate allocation system 104 determines that the amount of remaining bandwidth (e.g., $W_S$ and $W_{S1}$) is insufficient to stream one or more tile assigned to a particular priority class (e.g., $P_1$ and $P_2$ streaming at bit rates $W_{P1}$ and $W_{P2}$, respectively). In such cases, the adaptive rate allocation system 104 identifies whether the surplus bandwidth can accommodate streaming one or more tiles at the next highest quality level using the next highest bit rate.

To illustrate, suppose the adaptive rate allocation system 104 has allocated each tile with the highest assigned priority (e.g., $P_1$) to stream at the highest bit rate. Further suppose that the adaptive rate allocation system 104 determines that tiles assigned to the next highest priority level (e.g., $P_2$) cannot be streaming using the highest bandwidth (i.e., $W_{S1} - W_{P2} < 0$) given the bandwidth budget. As such, the adaptive rate allocation system 104 determines if the tiles assigned to the priority $P_2$ can be streamed to the virtual reality display device at the second highest quality level using the second highest bit rate. If so, the adaptive rate allocation system 104 allocates the tiles assigned to priority $P_2$ to the second highest bit rate. Further, the adaptive rate allocation system 104 similarly determines whether tiles with assigned priority $P_3$ can also be streamed with the second highest bit rate given the remaining bandwidth.

If, however, the adaptive rate allocation system 104 determines that the tiles assigned to the priority $P_2$ cannot be streamed to the virtual reality display device at the second highest quality level using the second highest bit rate, the adaptive rate allocation system 104 determines if the tiles assigned to the priority P$_2$ can be streamed at a third highest quality level using the third highest bit rate given the remaining available bandwidth. The adaptive rate allocation system 104 repeats this process for each priority class and each bit rate level until the amount of remaining available bandwidth is minimized or the adaptive rate allocation system 104 determines that one or more priority classes need to be streamed at the minimum acceptable quality level using the lowest bit rate.

In this manner, the adaptive rate allocation system 104 first ensures that all the tiles in a spherical video can be streamed at a minimum acceptable quality level. Then, the adaptive rate allocation system 104 fills the remaining available bandwidth with higher quality levels for one or more tiles of the spherical video based on the assigned priorities of the tiles until bandwidth efficiency is maximized. As such, the adaptive rate allocation system 104s adaptively prioritizes the tiles in a spherical video to deliver higher quality levels to the tiles where a user is currently looking/most likely to look, and lower quality levels to the tiles outside of a user's viewport.

In some example embodiments, the adaptive rate allocation system 104 designates minimum or maximum quality levels for particular tiles in a spherical video irrespective of the tile's assigned priority. For example, the adaptive rate allocation system 104 designates the top row of tiles in FIG. 5B to be streamed no higher than the second highest bit rate because the top row of tiles includes low amounts of virtual reality content, even if surplus bandwidth is available. Likewise, the adaptive rate allocation system 104 may also limit tiles that are a predetermined distance (e.g., over two tiles) from the viewport. Limiting the bandwidth of one or more tiles may enable the adaptive rate allocation system 104 to achieve higher throughput levels as the quality levels increase (e.g., to 8K and 12K resolutions). For instance, even though a particular tile can be allocated with a specific bit rate, the adaptive rate allocation system 104 reallocates the tile to a capped bit rate, thus, allowing other tiles to be streamed at higher bit rates than they otherwise might be streamed.

As previously mentioned, the adaptive rate allocation system 104 can generate and stream tiles in a spherical video at various qualities using corresponding bit rates. One metric of quality is the resolution on a tile. For example, the adaptive rate allocation system 104 streams the tiles at different resolutions using corresponding bit rates based on the tile's assigned priority and the bandwidth budget.

To illustrate, FIG. 6 shows an example diagram of different resolutions that the adaptive rate allocation system 104 employs to stream tiles of a spherical video to a client device as part of a resolution degrading process. In particular, FIG. 6 illustrates a resolution hierarchy 600 that includes multiple resolutions 602a-d. As shown, each resolution includes a resolution height (R$_H$) and a resolution width (R$_W$). For instance, R$_H$ indicates the number of pixels/rows in a segment or tile and R$_W$ indicates the number of pixels/columns in a segment or tile.

As shown in FIG. 6, the resolutions 602a-d increase from a lowest first resolution 602a (e.g., the minimum acceptable quality level) to a highest fourth resolution 602d (e.g., the highest quality level). For example, the first resolution 602a is a fraction of the size of the second resolution 602b, which itself is a fraction of the size of the third resolution 602c. Along the same lines, as the size of the resolutions significantly increases, the bit rate requirement needed to stream the segment must also significantly increase, which significantly influences the number of tiles that the adaptive rate allocation system 104 can stream given the limited bandwidth budgets of client devices. While four proportional levels of resolution are shown in FIG. 6, one will appreciate that the adaptive rate allocation system 104 can employ any number of resolutions. Further, resolutions can vary in height and/or width.

In one or more embodiments, the adaptive rate allocation system 104 initially allocates each tile in a spherical video to stream at the lowest first resolution 602a. Then, based on the priority of each tile and the amount of available bandwidth, the adaptive rate allocation system 104 reallocates one or more tiles to stream at higher resolutions as described above. For example, upon the adaptive rate allocation system 104 dividing a spherical video into a hexaface sphere having six tiles, the adaptive rate allocation system 104 allocates the middle body tile that overlaps the viewport to stream at the highest fourth resolution 602d, the two middle body tiles that are adjacent to the viewport to stream at the third resolution 602c, the last middle body tile to stream at the second resolution 602b, and the top tile and bottom tile to both stream at the lowest first resolution 602a (e.g., the minimum acceptable resolution). Based on the allocation, the adaptive rate allocation system 104 streams each of the tiles at a bit rate corresponding to the allocated resolution.

As shown in the illustrated embodiment in FIG. 6, the adaptive rate allocation system 104 can select one of four resolutions for each tile. In this case, the adaptive rate allocation system 104 can generate and/or store each of the four resolutions for each tile. For example, the adaptive rate allocation system 104 performs pre-processing to create and store each of the resolutions for each tile in a spherical video. Then, upon allocating a resolution to a tile based on a user's interaction with the spherical video, the adaptive rate allocation system 104 accesses and streams the tile at the allocated resolution. Alternatively, the adaptive rate allocation system 104 generates, in real time, the resolution needed for each tile based on the allocation for the tile.

The adaptive rate allocation system 104 can employ a variety of methods to stream the tiles to the client device. In some example embodiments, the adaptive rate allocation system 104 streams each of the tiles in parallel using multi-threading techniques to ensure that all tiles start streaming at the same time. In other words, the adaptive rate allocation system 104 streams each of the tiles at the same time to the client device irrespective of a tile's priority. Alternatively, the adaptive rate allocation system 104 streams the tiles according to tile priority. In these embodiments, the adaptive rate allocation system 104 streams tiles from highest priority to lowest priority. In this manner, the adaptive rate allocation system 104 streams tiles to the user that the user is viewing/most likely to view before tiles that are outside of the user's view.

In other embodiments, the adaptive rate allocation system 104 streams tiles based on the tile's resolution. For example, the adaptive rate allocation system 104 streams the minimum acceptable resolution for all tiles. Then, the adaptive rate allocation system 104 provides the next lowest resolution for the tiles allocated to the next lowest bit rate. The adaptive rate allocation system 104 repeats this process until all allocated resolutions are sent. As a note, when the adaptive rate allocation system 104 streams a higher resolution after streaming a lower resolution for the same tile, the higher resolution scales, builds, and adds enhancements to the lower resolution (e.g., see use of SHVC (Scalable HEVC) of H.265 for a layered streaming). In this manner, the adaptive rate allocation system 104 is not resending or replacing any data previously sent for a tile, but rather is adding to the data previously sent for the tile.

In some embodiments, the adaptive rate allocation system 104 sends all tiles at the minimum acceptable resolution for all tiles. For any remaining tiles having a higher resolution allocation, the adaptive rate allocation system 104 streams from the highest priority tile to lowest priority tile. In this manner, after the adaptive rate allocation system 104 provides a base layer resolution for each tile, the adaptive rate allocation system 104 then streams from the highest resolution tiles (e.g., the highest priority tiles) to the second lowest resolution tiles.

A more detailed embodiment of allocating resolutions and/or bit rates to tiles in a spherical video is now given. As described above, the adaptive rate allocation system 104 divides a spherical video into n tiles, represented as $T=\{t_1, t_2, \ldots, t_n\}$. The highest possible quality level for each $t_i \in T$ has a bit rate requirement of $s_{ti}$ and a priority coefficient of $p_{ti}$. As mentioned above, the adaptive rate allocation system 104 assigns the highest priority to tiles within the user's immediate viewport (e.g., $P_1$), and lowest priority (e.g., $P_3$) to the tiles in the area outside the user's viewport in the spherical video.

In addition, the quality contribution of tile $t_i$, represented as $q_{ti}$, is a function of the tile's bit rate requirement (i.e., $s_{ti}$) and priority coefficient (i.e., $p_{ti}$). Accordingly, $s_{ti} \times p_{ti} = q_{ti}$. In addition, as mentioned above, client devices often have a limited bandwidth budget (e.g., $W_B$) that limits the total bit rate for all the tiles that the adaptive rate allocation system 104 can send to the client device.

In this example embodiment, let $X=\{x_1, x_2, \ldots x_i\}$ represent a set of tiles that the adaptive rate allocation system 104 provides to the client device. Further, each $x_i \in X$ corresponds to the original tile $t_i \in T$. Accordingly, each $x_i$ has a priority coefficient $p_{xi} = p_{ti}$, or in other words, the priority coefficient between the sent tiles and original tiles match.

In addition, in the example embodiment, let L represent the number of quality levels (e.g., resolutions) with each quality level having the label k, noted as $R_k$ ($0 \le k \le L$) and the bit rate of tile $t_i$ with representation $R_k$ noted as $s_{t_i}^{R_k}$. Further, the lowest quality level corresponds to the lowest bit rate, which is represented $R_L$, and which is the minimum bit rate that users can tolerate (e.g., the minimum acceptable quality level). Furthermore, the quality contribution of tile $x_i$ is $q_{xi}$ (e.g., $s_{xi} \times p_{xi} = q_{th}$).

Moreover, let S be the total bit rate of streaming tiles of a spherical video. Then, for each tile $t_i$ in T, the adaptive rate allocation system 104 calculates $q_i$ as described previously, which is the contribution that $t_i$ would make to the average quality if the adaptive rate allocation system 104 streams $t_i$ at the highest bit rate possible. The adaptive rate allocation system 104 then calculates the minimum bit rate needed to stream all the tiles at their lowest bit rate, which is represented as $W_{min} = \Sigma s_{t_i}^{R_L}$. Additionally, because $W_{min} \le W_B$, the amount of available bandwidth, Ws, is represented as $Ws = W_B - W_{min}$, as described previously. Additionally, in the example embodiment, to determine the optimal bit rate for each tile, the adaptive rate allocation system 104 sorts the prioritized list of tiles by a global priority from largest to smallest. For ease of notation, suppose that the tiles are re-indexed so that the sorted list of tiles is $t_1, t_2, \ldots, t_n$. If $s_{t1} - s_{t_1}^{R_L} \le W_s$, then the surplus bandwidth (i.e., $W_s$) is sufficient to accommodate sending $t_1$ at the highest bit rate ($R_0$). Tile $x_1$ has bit rate $s_{x1} = s_{t1}$ and contributes $q_1$ to the average quality. In addition, this leaves the additional bandwidth surplus (i.e., $W_{S1}$) as $W_{S1} = W_s - s_{t_1}^{R_0} - s_{t_1}^{R_L}$ for the remaining tiles after $x_1$. The above algorithm repeats for $t_2, t_3, \ldots, t_n$ until the adaptive rate allocation system 104 cannot stream one or more tiles $t_i$ at the highest bit rate within the remaining bandwidth budget $W_{l-1}$.

The adaptive rate allocation system 104 then determines the highest possible bit rate at which it can stream to the client device by calculating the lowest quality level L': $L' \le L$ such that $s_{t_l}^{R_{L'}} \le W_{l-1} + s_{t_l}^{R_L}$. The tile $x_l$ has bit rate $s_{xl} = s_{t_l}^{R_{L'}}$ contributes $q'_l$ to the average quality. Then, the remaining bandwidth budget after streaming $x_l$ will be $W_l = W_{l-1} - s_{t_l}^{R_{L'}}$. Again, the example algorithm repeats the above process to determine the proper bit rates, surplus bandwidth and bandwidth budget amounts, and the quality contribution for each of the remaining tiles $x_{l+1}, x_{l+2}, \ldots, x_n$. In this manner, the adaptive rate allocation system 104 maximizes bandwidth efficiency while streaming tiles of a spherical video at the highest quality level possible while given the bandwidth budget.

As a note, in one or more instances, such as shown above in Listing 2, the adaptive rate allocation system 104 runs a one-time implementation at the beginning of the session for the main process. By performing the one-time implementation, the adaptive rate allocation system 104 can execute in real-time and does not require any additional overhead during the runtime. Stated differently, the adaptive rate allocation system 104 can operate efficiently in O(n log n) time and O(n) space and can produce solutions that are close to optimal. In addition, the approximation error depends on the difference between the bit rate chosen for the first tile that cannot be received at highest bit rate (i.e. $t_i$) and the remaining surplus bandwidth budget. It should be noted that resolution degrading is optional. In alternative embodiments, the adaptive rate allocation system 104 degrades just the quality and the overall bitrate instead of changing resolutions.

Figure 7:
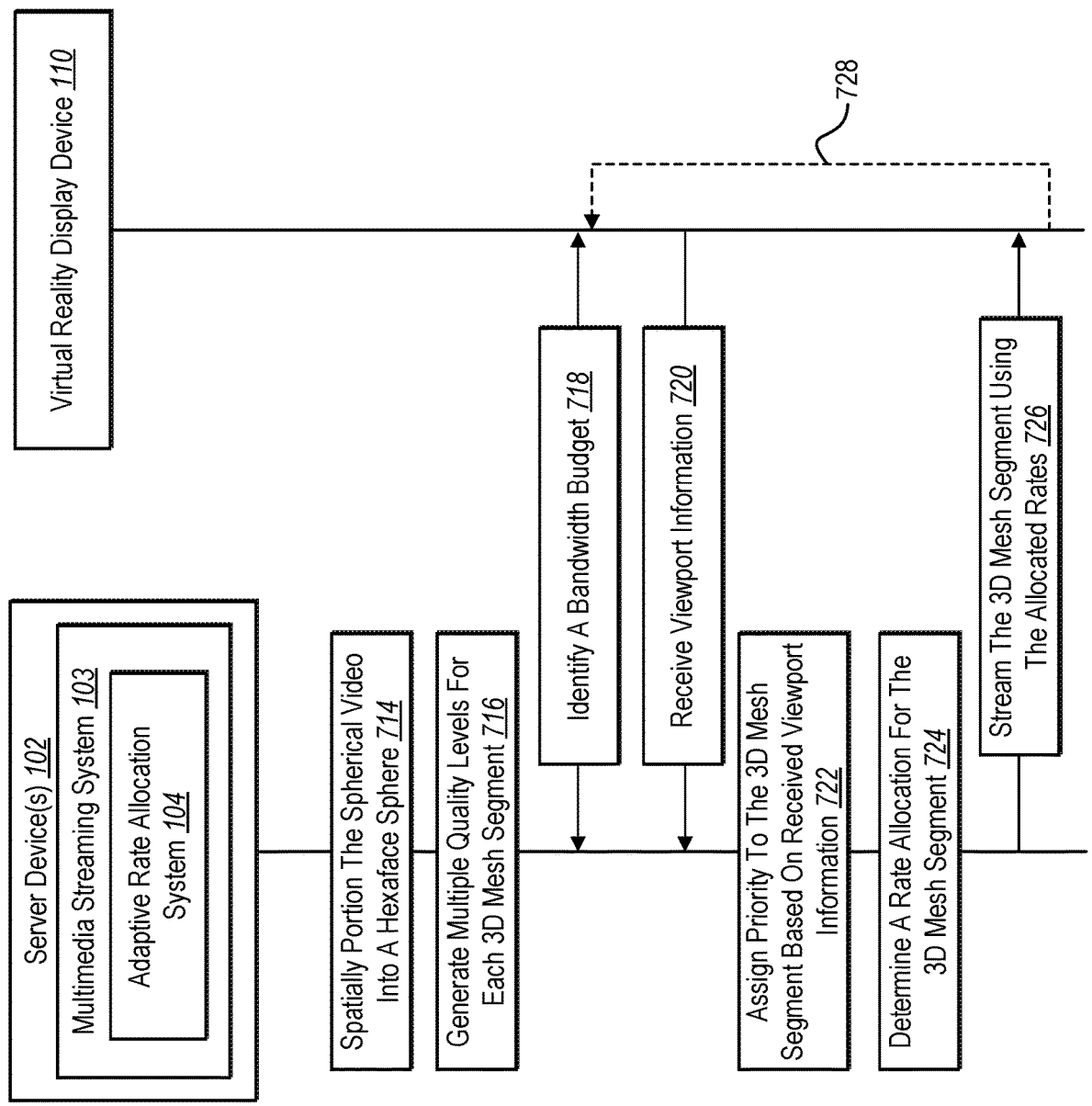
FIG. 7 illustrates a sequence diagram of streaming a virtual reality video using the adaptive rate allocation system in accordance with one or more embodiments.

Turning now to FIG. 7, which illustrates a sequence diagram of streaming a virtual reality video using the adaptive rate allocation system 104. As shown, FIG. 7 includes a server device 102 that includes the adaptive rate allocation system 104, and a virtual reality display device 110. The adaptive rate allocation system 104 obtains a spherical video. For example, the adaptive rate allocation system 104 receives a data stream of a spherical video at the highest resolution, which the adaptive rate allocation system 104 can later degrade if necessary. Alternatively, the adaptive rate allocation system 104 receives multiple resolutions of the spherical video from a content provider device. In yet further embodiments, the adaptive rate allocation system 104 accesses a stored spherical video on the server device(s) 102.

Upon receiving a spherical video, the adaptive rate allocation system 104 spatially partitions 714 the spherical video into a hexaface sphere (i.e., panorama video) that comprises 3D mesh segment. The adaptive rate allocation system 104 selects a 3D template mesh and applies (e.g., maps) the 3D template mesh to the received spherical video. As part of mapping the spherical video to the 3D template, the adaptive rate allocation system 104 transfers vertex locations and texture coordinates from the 3D template to the spherical video. In this manner, the adaptive rate allocation system 104 achieves an equirectangular mapping of the spherical video (i.e., panorama video).

In addition, the adaptive rate allocation system 104 partitions the mapped spherical video vertically and horizontally (e.g., slices and stacks) using the 3D mesh transferred from the 3D template. Then, using the partitions, the adaptive rate allocation system 104 portions the segments into six 3D mesh segments (or another number of 3D mesh segments) to form the hexaface sphere (i.e., hexaface spaces).

As shown in FIG. 7, the adaptive rate allocation system 104 generates 716 multiple quality levels for each 3D mesh segment. As mentioned above, the adaptive rate allocation system 104 streams the spherical video to a client device using the highest quality level and bit rates possible given the bandwidth constraints (e.g., the bandwidth budget). As a result, the adaptive rate allocation system 104 often streams various segments at different quality levels (e.g., resolutions).

To generate multiple quality levels for each 3D mesh segment, in one or more embodiments, the adaptive rate allocation system 104 generates a copy of each resolution level for each 3D mesh segment. For example, if four resolutions are available (e.g., see FIG. 6), then the adaptive rate allocation system 104 generates three lower resolution copies of each 3D mesh segment from the highest resolution copy received from the content provider device 706.

In some example embodiments, as mentioned above, the adaptive rate allocation system 104 receives different quality levels for a spherical video from the content provider device 706. In these embodiments, the adaptive rate allocation system 104 spatially partitions each copy of the spherical video into corresponding 3D mesh segments (i.e., the hexaface sphere), as described above. In this manner, the adaptive rate allocation system 104 has access to the different quality levels for each 3D mesh segment of the spherical video (i.e., panorama video).

As shown, the adaptive rate allocation system 104, with the virtual reality display device 110, identifies 718 a bandwidth budget. For example, the adaptive rate allocation system 104 and the virtual reality display device 110 transmit test files or other data between each other to determine the amount available bandwidth and/or a bandwidth budget. Further, in one or more embodiments, the adaptive rate allocation system 104 and the virtual reality display device 110 periodically check and update the bandwidth budget as network conditions change.

In some example embodiments, the virtual reality display device 110 provides the adaptive rate allocation system 104 with a predetermined bandwidth budget. For example, the virtual reality display device 110 indicates its maximum bit rate receiving and/or processing capacity to the adaptive rate allocation system 104. In various embodiments, the adaptive rate allocation system 104 identifies characteristics of the virtual reality display device 110 or a network connection and then determines the bandwidth budget based on the characteristics. For instance, the adaptive rate allocation system 104 determines the higher bandwidth budget for a wired virtual reality display device 110 than for a wireless virtual reality display device 110.

Using the bandwidth budget, the adaptive rate allocation system 104 also receives 720 viewport information from the virtual reality display device 110. As described above, viewport information indicates the direction and orientation of the virtual reality display device 110. As such, the adaptive rate allocation system 104 uses the viewport information to identify the coordinates of the user's viewport within the spherical video, which the adaptive rate allocation system 104 further uses to identify which 3D mesh segments overlap with, and are adjacent to the viewport.

The adaptive rate allocation system 104 assigns 722 priority to the 3D mesh segments based on the received viewport information. For example, the adaptive rate allocation system 104 identifies which 3D mesh segments overlap with the viewport and assigns those 3D mesh segments with the highest priority. In addition, the adaptive rate allocation system 104 assigns the highest or a next highest priority to 3D mesh segments that are adjacent to the viewport. Further, the adaptive rate allocation system 104 assigns a lower priority to 3D mesh segments located farther away from the viewport (e.g., outside the user's peripheral view within the spherical video). The adaptive rate allocation system 104 may alternatively assign priorities to 3D mesh segments as described above.

Based on the assigned priorities of each 3D mesh segment, the adaptive rate allocation system 104 determines 724 a bit rate allocation for each 3D mesh segment. To demonstrate, the adaptive rate allocation system 104 identifies a minimum bit rate that corresponds to the lowest acceptable quality of the spherical video. In other words, the adaptive rate allocation system 104 determines at what bit rate the adaptive rate allocation system 104 can stream each 3D mesh segment to the client device 708 at the lowest quality level. In general, when streaming each 3D mesh segments at the lowest quality level, the bit rate needed to stream the 3D mesh segments is lower than the bandwidth budget.

In addition, there is often extra bandwidth remaining to stream one or more times at a higher quality level. To illustrate, in one or more embodiments, the adaptive rate allocation system 104 identifies the highest priority 3D mesh segment(s) and determines if the surplus bandwidth accommodates streaming the highest priority 3D mesh segment(s) at a corresponding (higher) bit rate. If so, the adaptive rate allocation system 104 allocates the highest priority 3D mesh segment(s) to the corresponding bit rate. If not, the adaptive rate allocation system 104 determines if the highest priority 3D mesh segment(s) can be streamed at the next highest quality level and corresponding bit rate. The adaptive rate allocation system 104 repeats the process, as described above in additional detail, until each 3D mesh segment in the spherical video is allocated to the highest possible quality level and corresponding bit rate that maximizes bandwidth throughput given the bandwidth budget.

As shown, the adaptive rate allocation system 104 streams 726 the 3D mesh segments using the allocated bit rates. The adaptive rate allocation system 104 streams the 3D mesh segments in parallel, serial, or a combination as described above. Further, the adaptive rate allocation system 104 can intelligently stream each 3D mesh segments based on the assigned priority and allocated bit rate of a 3D mesh segment, as previously described.

In addition, the adaptive rate allocation system 104 can repeat (e.g., shown as step 728) the process of receiving 720 viewport information, assigning 722 priority to the 3D mesh segments, determining 724 a bit rate allocation, and streaming the 3D mesh segments as the spherical video plays. For example, as the user interacts (e.g., changes position, engages with objects, etc.) within the spherical video, this viewport information is transmitted back to the adaptive rate allocation system 104, which continually re-priorities 3D mesh segments and re-allocates bit rates for the 3D mesh segments to provide the user with an optimal virtual reality experience. For instance, in some example embodiments, the adaptive rate allocation system 104 receives viewport updates every one or two seconds and provides updated virtual reality content to the virtual reality display device 110, as described above.

Additionally, the steps and actions described herein may be performed in a different order, may be repeated or performed in parallel with one another, or may be performed in parallel with different instances of the same or similar steps or actions. For example, although FIG. 7 illustrates a step of the adaptive rate allocation system 104 spatially partitioning 714 a spherical video (i.e., panorama video) into a hexaface sphere (i.e., hexaface spaces) having a number of 3D mesh segments, in one or more embodiments, the adaptive rate allocation system 104 otherwise divides the spherical video into a plurality of tiles, as described above.

Figure 8:
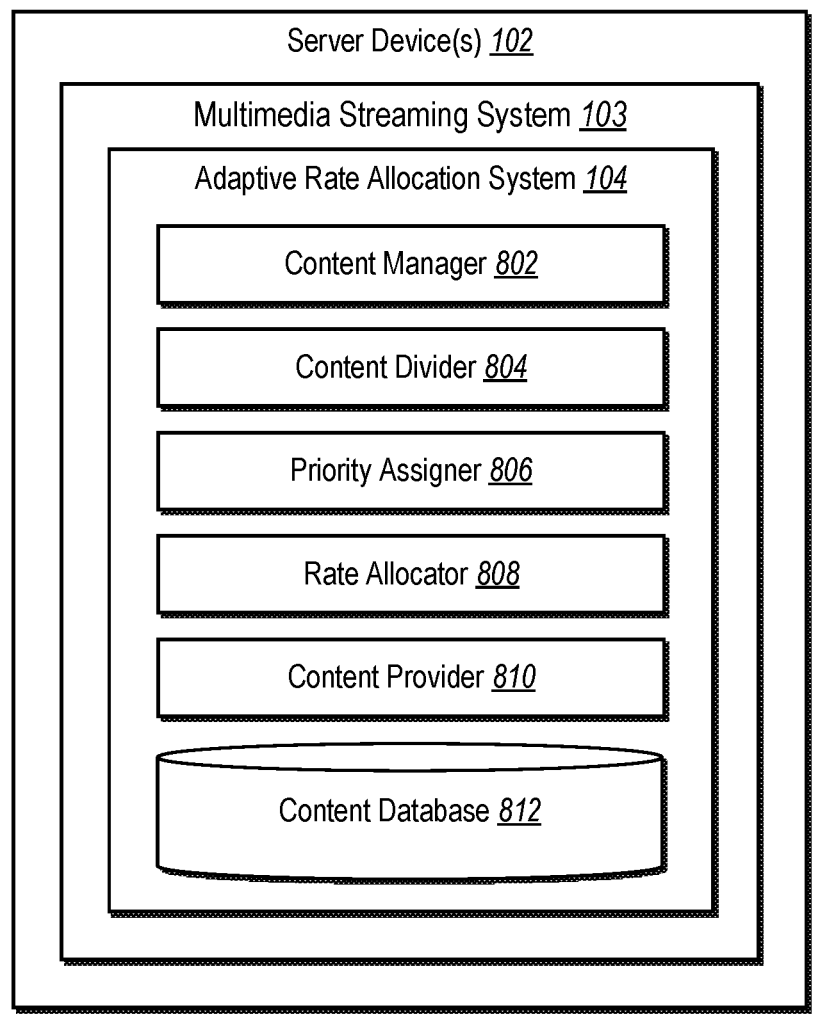
FIG. 8 illustrates an example embodiment of the adaptive rate allocation system in accordance with one or more embodiments.

Turning now to FIG. 8, additional detail is provided regarding components and capabilities of one embodiment of the adaptive rate allocation system 104. In particular, FIG. 8 illustrates an example embodiment of the adaptive rate allocation system 104. As shown, the adaptive rate allocation system 104 in FIG. 8 operates on one or more server devices 102, such as the one or more server devices described in connection with FIG. 1 above.

The adaptive rate allocation system 104 includes, but is not limited to, a content manager 802, a content divider 804, a priority assigner 806, a rate allocator 808, a content provider 810, and a content database 812. Each of these components are described below in additional detail.

As recently mentioned, and as illustrated in FIG. 8, the adaptive rate allocation system 104 includes a content manager 802. The content manager 802 can obtain panorama videos and other virtual reality content. For example, the content manager 802 receives one or more 3D virtual reality panorama videos from a third-party content provider. In some example embodiments, the content manager 802 can create, generate, or modify virtual reality content included in a panorama video.

In addition, as illustrated in FIG. 8, the adaptive rate allocation system 104 also includes a content divider 804. The content divider 804 partitions a panorama video into multiple 3D mesh segments and/or tiles. For instance, the content divider 804 creates hexaface spaces (e.g., forming a hexaface sphere) for a panorama video (e.g., spherical video), as previously described. The content divider 804 can employ various methods and techniques to divide a panorama video into segments or tiles, as described above.

Moreover, as illustrated in FIG. 8, the adaptive rate allocation system 104 also includes the priority assigner 806. The priority assigner 806, in general, assigns a priority to each segment or tile in a panorama video. Priority is often based on viewport information received from a user's client device and/or virtual reality display. As described in detail, the priority assigner 806 assigns higher priority to segments that a user is viewing (e.g., within the viewport) and lower priority to segments outside of the user's immediate view.

As illustrated in FIG. 8, the adaptive rate allocation system 104 also includes the rate allocator 808. In general, the rate allocator 808 determines at which quality level (e.g., resolution) and bit rates to stream each segment. More specifically, the rate allocator 808 balances available bandwidth in a bandwidth budget with bit rate requirements and limitations. In this manner, the rate allocator 808 maximizes video quality while maximizing bandwidth efficiency while providing the highest possible video quality. Additional detail regarding determining rate allocations is provided above.

As shown in FIG. 8, the adaptive rate allocation system 104 also includes the content provider 810. The content provider 810, in general, provides the allocated segments to one or more user's client device having a virtual reality display. For example, the content provider 810 streams, in parallel or serial, each segment of a panorama video at the allocated bit rate. Additional description regarding provided allocated segments is provided above.

In some example embodiments, the content provider 810 streams panorama video to a client device encoded and packaged use MPEG-DASH SRD (Dynamic Adaptive Streaming over HTTP (DASH) Spatial Relation Description (SRD)), which assists in describing the spatial relationship of 3D mesh segments and/or tiles in the virtual reality space. As an overview, DASH specifically, also known as MPEG-DASH, is an ISO standard that enables adaptive bit rate streaming to a client device based on constrained resources, such as the amount of bandwidth available at the client (e.g., bandwidth budget). The multimedia content is stored on an HTTP server and is accompanied by a Media Presentation Description (MPD) as a manifest of the available segments, their various bit rate alternatives, their URL addresses, and other characteristics.

Furthermore, as shown in FIG. 8, the adaptive rate allocation system 104 also includes the content database 812. The content database 812 stores received panorama videos and/or copies of panorama video at various quality levels. In addition, the content database 812 can store divided segments and/or tiles at various quality level to be streamed to a user's client device.

Each of the components 802-812 of the adaptive rate allocation system 104 (as shown in FIG. 8) can comprise software, hardware, or both. For example, the components 802-812 can comprise one or more instructions stored on a computer-readable storage medium and executable by processors of one or more computing devices, such as a client device or server device. When executed by the one or more processors, the computer-executable instructions of the adaptive rate allocation system 104 can cause the computing device(s) to perform the feature learning methods described herein. Alternatively, the components 802-812 can comprise hardware, such as a special purpose processing device to perform a certain function or group of functions. Alternatively, the components 802-812 of the adaptive rate allocation system 104 can comprise a combination of computer-executable instructions and hardware.

Furthermore, the components 802-812 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 may be implemented as a stand-alone application, such as a desktop or mobile application. Furthermore, the components 802-812 may be implemented as one or more web-based applications hosted on a remote server. The components 802-812 may also be implemented in a suite of mobile device applications or "apps." To illustrate, the components 802-812 may be implemented in an application, including but not limited to ADOBE PRIME-TIME software. "ADOBE," and "PRIMETIME" are either registered trademarks or trademarks of Adobe Systems Incorporated in the United States and/or other countries.

To evaluate the effectiveness of one or more embodiments, evaluators used a Samsung Gear VR HMD mounted with the Samsung Galaxy S7 smartphone with 4 GB RAM and Android Marshmallow 6.0.1 as a target virtual reality display device. The evaluators used Oculus Mobile SDK 1.0.3 joint with Android SDK API 24 for development of a 360 VR video streaming application prototype based on MPEG-DASH SRD, and used that to apply adaptations and run experiments.

The target virtual reality display device provides a total resolution of 2560×1440 (1280×1440 per eye), with maximum frame rate of 60 FPS and a horizontal FoV (field-ofview) of 96 degrees. The evaluators set the vertical FoV of the 360 VR video prototype to 90 degrees. The evaluators prepared five different 360 qui-rectangular-formatted sample videos publicly available as test sequences for the purpose of applying different embodiments. In particular, five sample videos had the following specifications: Sample 1: 3840×1920 resolution, 20.0 Mbps original bitrate, and 30 Hz FPS; Sample 2: 3840×1920 resolution, 13.1 Mbps original bitrate, and 30 Hz FPS; Sample 3: 1920×690 resolution, 4.4 Mbps original bitrate, and 30 Hz FPS; Sample 4: 3840×2160 resolution, 13.0 Mbps original bitrate, and 24 Hz FPS; and Sample 5: 4096×2048 resolution, 12.6 Mbps original bitrate, and 24 Hz FPS.

To benefit from the features of MPEG-DASH SRD-based streaming and for the purpose of texturing the hexaface sphere mesh, the evaluators spatially cropped the video and generated 6 different tiles as per a hexaface sphere geometry. The evaluators encoded all video segments with H.264 AVC encoder into L=4 different representations using a hierarchical resolution degrading, with original resolutions decreasing polynomially every step, as depicted in FIG. 6. Assuming $R_{w(TREp_i)}$ is the resolution width (and similarly the resolution height is $R_{h(TREp_i)}$) of a specific video tile T for the representation i, then:

$$R_{(TREPi)} = R_{(TREP1)} * \frac{(4-(i-1))}{4}.$$

The evaluators used a Dell XPS 8900 x64-based PC mounted with Microsoft Windows 7 Professional version 6.1.7601 OS as the HTTP-based streaming server, and used MPEG-DASH SRD to describe the tiling. For the purpose of quantitative quality measurement, the quality of a 360 VR video session is a function of bitrates for all tiles (with maximum quality corresponding to maximum resolutions of all delivered tiles). This approach is general and is independent from the measure of quality. In this initial study, the evaluators used the average bitrate. The evaluators applied various sets of resolutions to different tiles to experiment how prioritized adaptations affects the average bitrate as well as the perceived quality.

The evaluators collected statistics for the average bitrate, and compared the results with the current practices in 360 VR video players where no tiled-based approach is employed. Each trial was run for a total of 30 seconds, and during each trial each tile is within user's viewport for 5 seconds. The evaluators measured the bandwidth usage in terms of average bitrate, when maximum resolution is assigned for tiles within immediate FoV, and two different lower resolutions, one with lowest resolution ($REP_1$) and other with second highest resolution ($REP_3$) assigned to the peripheral tiles.

As a baseline case, no adaptation is applied, the 360 VR video is tiled, no viewport awareness is present, and all tiles are streamed with highest representation ($REP_1$). For sample 1, a $REP_4$ used 27.7% of the baseline case and a $REP_2$ used 74.1% of the baseline case. For sample 2, a $REP_4$ used 27.8% of the baseline case and a $REP_2$ used 62.9% of the baseline case. For sample 3, a $REP_4$ used 32.6% of the baseline case and a $REP_2$ used 72.0% of the baseline case. For sample 4, a $REP_4$ used 30.1% of the baseline case and a $REP_2$ used 74.4% of the baseline case. For sample 5, a $REP_4$ used 45.3% of the baseline case and a $REP_2$ used 75.6% of the baseline case. Thus, embodiments can significantly save bandwidth usage for up to 72% compared to the baseline case.

Furthermore, even the lowest representation on the peripheral tiles not within immediate viewports resulted in minor visual changes from a user's perspective, sometimes not even perceptible, yet at the same time it maintains the original quality for the main viewport to ensure a satisfactory user experience. The tiling approach can further increase the overall quality of 360 VR videos, virtually enabling a total 360-degree video resolution of 8K and higher in the 360-degree space. It makes it possible to stream tiles within the viewport at even higher resolutions, at or near the native resolution of the HMD, which previously was not possible due to the limited hardware resources processing a single bulky video content.

Figure 9:
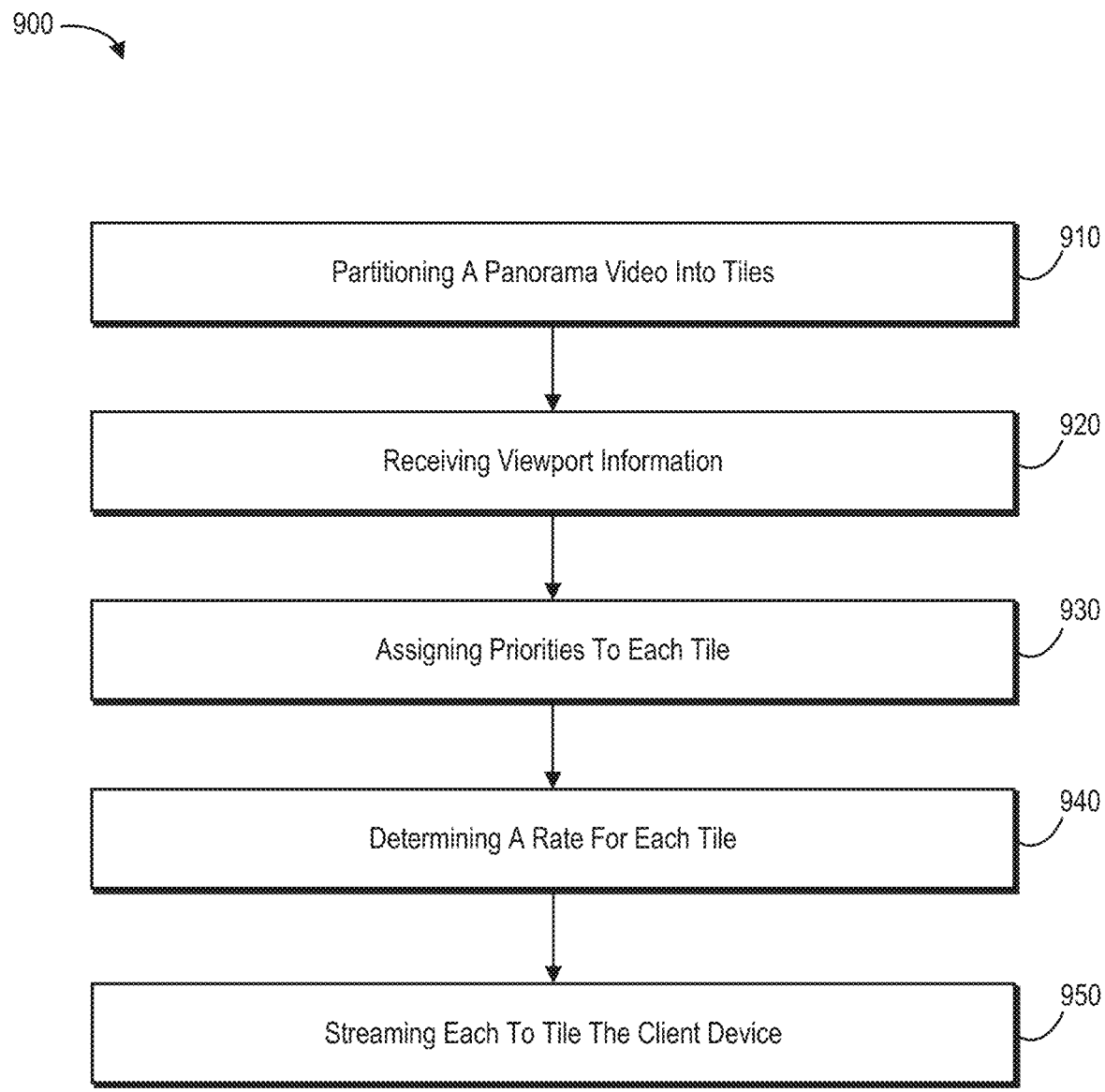
FIG. 9 illustrates a flowchart of a series of acts in a method for providing bandwidth-efficient virtual reality video in accordance with one or more embodiments.

FIGS. 1-8, the corresponding text, and the examples provide a number of different systems and devices for streaming virtual reality content. In addition to the preceding, embodiments can also be described in terms of flowcharts comprising acts and steps in a method for accomplishing a particular result. For example, FIG. 9 illustrates a flowchart of an exemplary method in accordance with one or more embodiments. The methods described in relation to FIG. 9 may be performed with less or more actions, or the actions may be performed in differing orders. Additionally, the actions described herein may be repeated or performed in parallel with one another or in parallel with different instances of the same or similar actions.

FIG. 9 illustrates a flowchart of a series of acts in a method 900 for providing bandwidth-efficient virtual reality video in accordance with one or more embodiments. In one or more embodiments, the method 900 is performed in a digital medium environment that includes the adaptive rate allocation system 104, such as a digital medium environment for providing an immersive virtual reality experience. The method 900 is intended to be illustrative of one or more methods in accordance with the present disclosure and is not intended to limit potential embodiments. Alternative embodiments can include additional, fewer, or different acts than those articulated in FIG. 9.

As illustrated in FIG. 9, the method 900 includes an act 910 of partitioning a panorama video into tiles. In particular, the act 910 can involve partitioning a panorama video into a plurality of tiles 310*a-c*. For example, the act 910 can include employing a spatial relationship description to partition the panorama video into a plurality of tiles. In some example embodiments, the panorama video includes a spherical video or a 360-degree video. In these embodiments, the plurality of tiles combines to form a 360-degree field-of-view. In other embodiments, the panorama video includes less than a 360-degree field-of-view. In several example embodiments, the panorama video is a stereo video comprising two corresponding video streams. In one or more embodiments, the act 910 includes generating one or more top tiles, one or more bottom tiles, and a plurality of middle body tiles.

Similar to act 910, in some example embodiments, 3D mesh segments are generated by performing a step for spatially partitioning the panorama video into a three-dimensional (3D) hexaface spaces. In these embodiments, the step includes the acts of dividing the panorama video into a plurality of vertical stacks and a plurality of horizontal slices and partitioning the panorama video, based on one or more stacks and/or slices, into a plurality of 3D meshes.

In addition, as shown in FIG. 9, the method 900 includes an act 920 of receiving viewport information. In particular, the act 920 can involve receiving viewport information from a client device. The act 920 can indicate a viewport from the viewport information and can also include position data indicating the location of the viewport (e.g., field-of-view) within the panorama video. Further, the method 900 can include an act of identifying one or more tiles of the plurality of tiles that overlap with the viewport and one or more tiles of the plurality of tiles that are adjacent to the viewport.

Moreover, the method 900 also includes an act 930 of assigning priorities to each tile. In particular, the act 930 can involve assigning, based on the viewport information, priorities to each tile of the plurality of tiles 506. In some example embodiments, the act 930 also includes assigning a highest priority level to the one or more tiles that overlap with the viewport, assigning a next highest priority level to the one or more tiles that are adjacent to the viewport, and assigning a lower priority level to a remaining one or more tiles of the plurality of tiles. In one or more embodiments, the act 930 includes assigning, based on the viewport, priorities to each tile of the plurality of tiles by determining a correlation between the current position of each tile within the panorama video and the current viewport.

In addition, as shown in FIG. 9, the method 900 includes an act 940 of determining a rate for each tile. In particular, the act 940 may involve determining, for each tile, a bit rate that corresponds to the assigned priority of the tile. In one or more embodiments, the act 940 can involve allocating bit rates to priority levels of tiles using a multiple-choice knapsack problem algorithm. For example, act 940 can include determining a minimum bit rate to stream the plurality of tiles to the client device, where the minimum bit rate corresponds to a lowest acceptable quality of the panorama video, and where streaming the plurality of tiles to the client device at the minimum bit rate does not exceed a bandwidth limit. In some example embodiments, the act 940 includes determining one or more higher bit rates to stream the plurality of tiles to the client device, where the one or more higher bit rates corresponds to one or more higher quality levels of the panorama video.

In one or more embodiments, determining the bit rate that corresponds to the assigned priority of each tile includes determining a first remaining bandwidth amount by subtracting the minimum bit rate for the plurality of tiles from the bandwidth limit (i.e., bandwidth budget), and determining that the first remaining bandwidth amount enables streaming one or more highest priority tiles of the plurality of tiles at a highest bit rate of the higher bit rates. In additional embodiments, determining the bit rate that corresponds to the assigned priority of each tile also includes determining a second remaining bandwidth amount by subtracting the highest bit rate for streaming the one or more highest priority tiles from the first remaining bandwidth amount, and determining that the second remaining bandwidth amount enables streaming one or more next highest priority tiles of the plurality of tiles at a next highest bit rate of the higher bit rates, wherein the next highest bit rate is below the highest bit rate and above the minimum bit rate.

In some embodiments, a bit rate is allocated to 3D mesh segments by performing a step for determining a bit rate allocation for each 3D mesh segment based on the assigned priority of each 3D mesh segment. For example, the step includes determining a minimum bit rate to stream the plurality of 3D meshes to the client device, where the minimum acceptable bit rate corresponds to a lowest acceptable quality of the panorama video, and where streaming the 3D mesh segments to the client device at the minimum bit rate does not exceed a bandwidth limit; determining a remaining bandwidth amount by subtracting the minimum bit rate for the 3D mesh segments from the bandwidth limit; and determining that the remaining bandwidth amount enables streaming one or more 3D mesh segments assigned to a highest priority at a highest bit rate.

In one or more embodiments, the act 940 includes iteratively determining a highest available bit rate to stream each tile of the plurality of tiles based on a ranking of the assigned priority of each tile and an amount of remaining available bandwidth such that any remaining available bandwidth is minimized, and where each tile of the plurality of tiles is stream at least at the minimum bit rate. In some example embodiments, tiles having the same priority are streamed at the same bit rate. Alternatively, tiles having the same priority are streamed at the different bit rates. In a few embodiments, determining, for each tile, a bit rate that corresponds to the assigned priority of the tile includes allocating tiles having a higher priority with a higher bit rate and tiles having a lower priority to a lower bit rate.

As illustrated in FIG. 9, the method 900 also includes an act 950 of streaming each tile to the client device. In particular, the act 950 can involve streaming each tile to the client device 108 using the corresponding determined bit rate. In some example embodiments, the act 950 include streamlined the tiles in parallel using multi-threading such that the tiles all begin streaming and/or playing on the client device 108 at the same time. Further, in one or more embodiments, the client device 108 includes a virtual reality display device 110, such as a wireless virtual reality display.

The term "digital environment," as used herein, generally refers to an environment implemented, for example, as a stand-alone application (e.g., a personal computer or mobile application running on a computing device), as a module of an application, as a plug-in for an application, as a library function or functions that may be called by a network application creation system, as a server device, and/or as a cloud-computing system. A digital medium environment allows the adaptive rate allocation system 104 to provide an immersive virtual reality experience to a user given limited bandwidth constraints.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
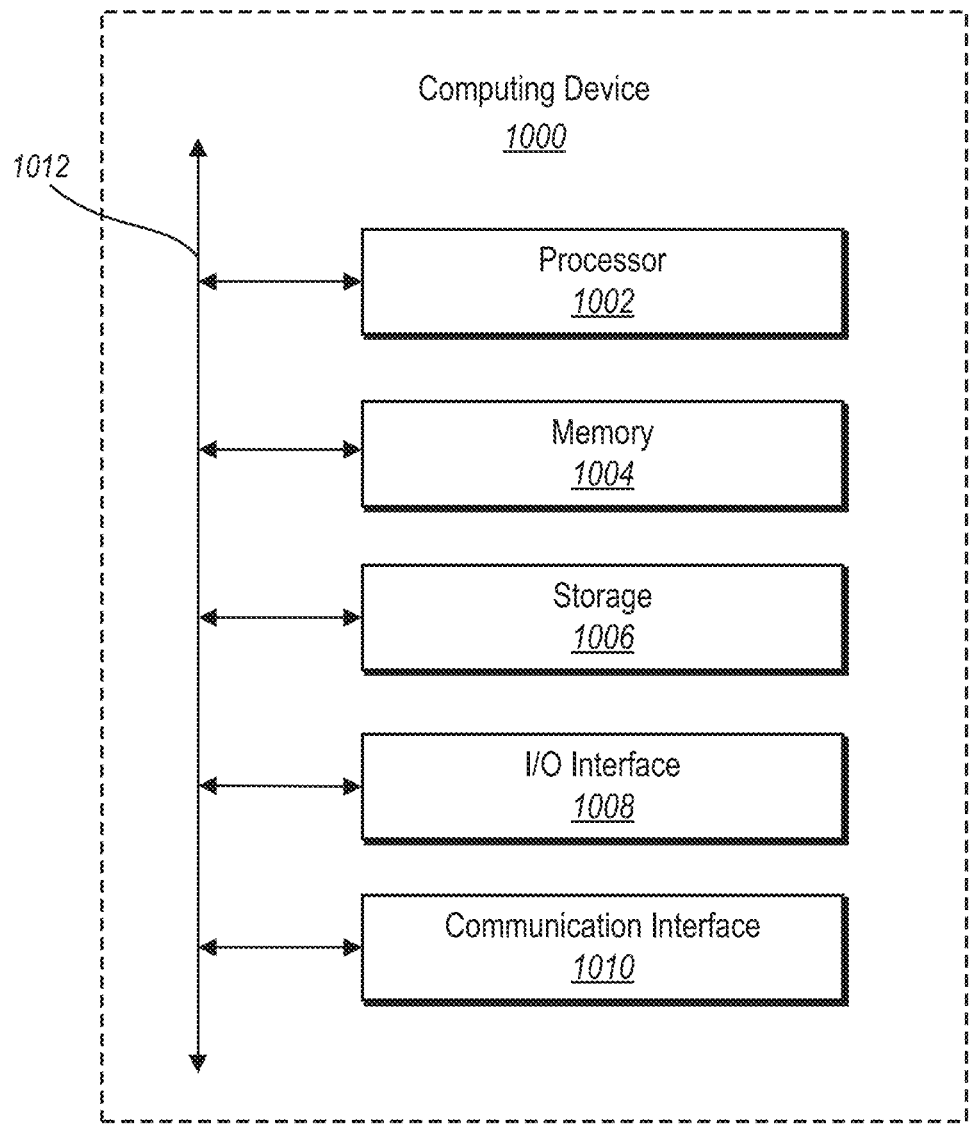
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the adaptive rate allocation system 104 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers.

In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the preceding specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the preceding description. All changes that come within the meaning and range of equivalency of the claims are to be embraced within their scope.

What is claimed is:

1. In a digital medium environment for providing a virtual reality experience, a computer-implemented method of streaming bandwidth-efficient virtual reality videos, the method comprising:
   partitioning a panorama video into a plurality of tiles;
   receiving viewport information about a viewport from a client device;
   assigning, based on the viewport information, priorities to each tile of the plurality of tiles, wherein a first set of tiles of the plurality of tiles overlapping with the viewport is assigned a higher priority, and wherein a second set of tiles of the plurality of tiles adjacent to the viewport is assigned a lower priority;
   determining a first surplus bandwidth amount by subtracting a minimum bit rate for the plurality of tiles from a bandwidth limit, the minimum bit rate corresponding to streaming the plurality of tiles of the panorama video at a minimum resolution;
   determining a higher bit rate based on the first surplus bandwidth amount at which to stream the first set of tiles;
   allocating the higher bit rate to the first set of tiles;
   determining a second surplus bandwidth amount by subtracting the higher bit rate for the first set of tiles, the minimum bit rate for the second set of tiles, and the minimum bit rate for an unallocated set of tiles of the plurality of tiles from the bandwidth limit;
   allocating a second bit rate, which is at least the minimum bit rate, to the second set of tiles based on the assigned lower priority and the second surplus bandwidth amount; and
   streaming, to the client device, the first set of tiles at the higher bit rate and the second set of tiles at the second bit rate.

2. The method of claim 1, further comprising employing a spatial relationship description to partition the panorama video into the plurality of tiles.

3. The method of claim 2, wherein:
   the panorama video comprises a 360-degree spherical video;
   the plurality of tiles combines to form the 360-degree spherical video; and
   partitioning the 360-degree spherical video into the plurality of tiles comprises generating one or more top tiles, one or more bottom tiles, and a plurality of middle body tiles.

4. The method of claim 3, further comprising streaming the first set of tiles at the higher bit rate in parallel with streaming the second set of tiles at the at least minimum bit rate.

5. The method of claim 1, further comprising:
   detecting an object in one or more tiles from the second set of tiles adjacent to the viewport;
   based on detecting the object, assigning the one or more tiles from the second set to the higher priority; and
   allocating the higher bit rate to the one or more tiles from the second set of tiles.

6. The method of claim 1, wherein the viewport information comprises position data indicating a location of a viewport within the panorama video.

7. The method of claim 1, wherein the unallocated set of one or more tiles of the plurality of tiles neither overlap with the viewport nor are adjacent to the viewport.

8. The method of claim 1, further comprising streaming the first set of tiles at the higher bit rate and the second set of tiles at the second bit rate without streaming duplicative data for a tile at different bit rates.

9. The method of claim 1, further comprising:
   determining that the second set of tiles assigned to the lower priority are streamable at the higher bit rate within the second surplus bandwidth amount; and
   based on determining that the second set of tiles are streamable at the higher bit rate within the second surplus bandwidth amount, allocating the second set of tiles to the higher bit rate.

10. The method of claim 9, further comprising:
    determining that the second set of tiles are not streamable at the higher bit rate within the second surplus bandwidth amount;
    based on determining that the second set of tiles are not streamable at the higher bit rate within the second surplus bandwidth amount, determining a next higher bit rate based on the second surplus bandwidth amount at which to stream the second set of tiles; and
    allocating the next higher bit rate to the second set of tiles.

11. The method of claim 9, further comprising:
determining that the second set of tiles are not streamable at the higher bit rate within the second surplus bandwidth amount;
allocating the minimum bit rate to the second set of tiles; and
allocating the minimum bit rate to the unallocated set of tiles.

12. The method of claim 10, further comprising:
determining a remaining surplus bandwidth amount by subtracting the higher bit rate for the first set of tiles, the next higher bit rate for the second set of tiles, and the minimum bit rate for the unallocated set of tiles from the bandwidth limit;
determining that the unallocated set of tiles assigned to a lowest priority are streamable at the next higher bit rate with the remaining surplus bandwidth amount; and
based on determining that the unallocated set of tiles are streamable at the next higher bit rate with the remaining surplus bandwidth amount, allocating the unallocated set of tiles to the next higher bit rate.

13. The method of claim 6, further comprising:
determining, based on the first surplus bandwidth amount, that the second set of tiles and the unallocated set of tiles are streamable at the higher bit rate; and
allocating the unallocated set of tiles to a lower bit rate based on a distance between the remaining set of tiles and the viewport satisfying a maximum viewing distance threshold.

14. A system for streaming virtual reality videos, the system comprising:
one or more memory devices comprising a virtual reality content repository; and
one or more server devices configured to cause the system to:
partition a panorama video into a plurality of tiles by dividing the panorama video into adjacent tiles;
receive viewport information for a viewport from a client device indicating a current viewport position within the panorama video;
assign, based on the viewport information, priorities to each tile of the plurality of tiles, wherein a first set of tiles of the plurality of tiles overlapping with the viewport is assigned a higher priority, and wherein a second set of tiles of the plurality of tiles adjacent to the viewport is assigned a lower priority;
determine a first surplus bandwidth amount by subtracting a minimum bit rate for the plurality of tiles from a bandwidth limit, the minimum bit rate corresponding to streaming the plurality of tiles of the panorama video at a minimum resolution;
determine a higher bit rate based on the first surplus bandwidth amount at which to stream the first set of tiles;
allocate the higher bit rate to the first set of tiles;
determine a second surplus bandwidth amount by subtracting the higher bit rate for the first set of tiles, the minimum bit rate for the second set of tiles, and the minimum bit rate for an unallocated set of tiles of the plurality of tiles from the bandwidth limit;
allocate a second bit rate, which is at least the minimum bit rate, to the second set of tiles based on the assigned lower priority and the second surplus bandwidth amount; and
stream, to the client device, the first set of tiles at the higher bit rate and the second set of tiles second bit rate.

15. The system of claim 14, wherein the one or more server devices are further configured to cause the system to stream the first set of tiles at the higher bit rate and the second set of tiles at the at least minimum bit rate without streaming duplicative data for a tile at different bit rates.

16. The system of claim 14, wherein streaming the plurality of tiles to the client device at the minimum bit rate does not exceed the bandwidth limit.

17. The system of claim 14, wherein the one or more server devices are further configured to cause the system to:
iteratively determine an available bit rate to stream each tile of the plurality of tiles based on a ranking of the assigned priority of each tile;
iteratively determine an amount of remaining available bandwidth such that bandwidth is minimized; and
allocate the available bit rate determined for each tile to each corresponding tile.

18. In a digital medium environment for providing a virtual reality experience, a computer-implemented method of streaming bandwidth-efficient virtual reality videos, the method comprising:
performing a step for spatially partitioning a spherical video into a three-dimensional (3D) hexaface sphere comprising 3D mesh segments;
receiving viewport information from a client device;
assigning, based on the viewport information, priorities to each of the 3D mesh segments, wherein a first set of 3D mesh segments of the 3D mesh segments overlapping with the viewport is assigned a higher priority, and wherein a second set of 3D mesh segments of the 3D mesh segments adjacent to the viewport is assigned a lower priority;
performing a step for determining a bit rate allocation for each of the 3D mesh segments based on the priority assigned to each of the 3D mesh segments; and
streaming, to the client device, the first set of 3D mesh segments at a higher bit rate and the second set of 3D mesh segments at an at least minimum bit rate based on the determined bit rate allocation of the first set of 3D mesh segments and the second set of 3D mesh segments.

19. The method of claim 18, wherein the viewport information comprises position data indicating a location of a viewport within the spherical video.

20. The method of claim 18, wherein streaming the 3D mesh segments to the client device at the minimum bit rate does not exceed a bandwidth limit.

* * * * *